United States Patent
Kiley et al.

(10) Patent No.: US 8,639,785 B2
(45) Date of Patent: *Jan. 28, 2014

(54) UNSOLICITED COOKIE ENABLED CONTEXTUAL DATA COMMUNICATIONS PLATFORM

(75) Inventors: Kevin J. Kiley, Bigelow, AR (US); Peter J. Cranstone, Parker, CO (US); Elizabeth A. Coker, Boulder, CO (US)

(73) Assignee: 5o9, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,600

(22) Filed: Aug. 1, 2012

(65) Prior Publication Data

US 2012/0317652 A1    Dec. 13, 2012

Related U.S. Application Data

(63) Continuation-in-part of application No. 13/442,609, filed on Apr. 9, 2012, which is a continuation of application No. 12/960,027, filed on Dec. 3, 2010, now Pat. No. 8,156,206, which is a continuation of application No. 12/016,996, filed on Jan. 19, 2008, now Pat. No. 7,873,710.

(60) Provisional application No. 61/514,010, filed on Aug. 1, 2011, provisional application No. 60/888,318, filed on Feb. 6, 2007.

(51) Int. Cl.
*G06F 17/30*    (2006.01)

(52) U.S. Cl.
USPC ............ 709/220; 709/203; 709/228; 455/310

(58) Field of Classification Search
USPC ........................... 709/220, 206, 228; 455/310
See application file for complete search history.

(56) References Cited

U.S. PATENT DOCUMENTS 5,930,474 A    7/1999    Dunworth et al.
5,946,615 A    8/1999    Holmes et al.
(Continued)

FOREIGN PATENT DOCUMENTS

EP    0848564    7/1998
EP    1009137    6/2000
(Continued)

OTHER PUBLICATIONS

Notice of Allowance for U.S. Appl. No. 12/960,027 mailed Mar. 5, 2012.

(Continued)

*Primary Examiner* — Khanh Dinh
(74) *Attorney, Agent, or Firm* — Hamilton, DeSanctis & Cha LLP

(57) ABSTRACT

Systems and methods for an unsolicited cookie enabled contextual data platform are provided. According to one embodiment, a mobile device is able to reconfigure a browser menu. An HTTP request is transmitted to a server device relating to a service supported by the server device. The request contains therein an unsolicited cookie including data indicative of information regarding (a) an end user of the mobile device, (b) the mobile device, (c) a location of the mobile device and/or (d) a network to which the mobile device is connected. Responsive to the request, an HTML file is received from the server device having embedded therein contextual menu information based on the service and the unsolicited cookie. The contextual menu information is extracted from the HTML file. End user interaction with the service is then customized by dynamically reconfiguring a browser menu of the mobile device based on the contextual menu information.

34 Claims, 8 Drawing Sheets

(56) References Cited

U.S. PATENT DOCUMENTS

| | | | |
|---|---|---|---|
| 6,115,611 A | 9/2000 | Kimoto et al. | |
| 6,606,744 B1* | 8/2003 | Mikurak | 717/174 |
| 6,609,005 B1 | 8/2003 | Chern | |
| 6,640,145 B2 | 10/2003 | Hoffberg et al. | |
| 6,671,818 B1 | 12/2003 | Mikurak | |
| 6,728,628 B2 | 4/2004 | Peterson | |
| 6,850,252 B1 | 2/2005 | Hoffberg | |
| 7,069,143 B2 | 6/2006 | Peterson | |
| 7,096,200 B2 | 8/2006 | Wang et al. | |
| 7,130,807 B1 | 10/2006 | Mikurak | |
| 7,424,098 B2 | 9/2008 | Kovales et al. | |
| 7,433,710 B2 | 10/2008 | Bodnar et al. | |
| 7,640,215 B2 | 12/2009 | Wang et al. | |
| 7,689,508 B2 | 3/2010 | Davis et al. | |
| 7,716,077 B1 | 5/2010 | Mikurak | |
| 7,873,710 B2* | 1/2011 | Kiley et al. | 709/220 |
| 7,957,991 B2 | 6/2011 | Mikurak | |
| 8,156,206 B2* | 4/2012 | Kiley et al. | 709/220 |
| 8,468,229 B2* | 6/2013 | Alessi et al. | 709/223 |
| 2003/0080995 A1 | 5/2003 | Tenenbaum et al. | |
| 2003/0095681 A1 | 5/2003 | Burg et al. | |
| 2003/0229900 A1 | 12/2003 | Reisman | |
| 2004/0147268 A1 | 7/2004 | Jensen et al. | |
| 2004/0193676 A1 | 9/2004 | Marks | |
| 2004/0205198 A1 | 10/2004 | Zellner et al. | |
| 2006/0074980 A1 | 4/2006 | Sarkar | |
| 2006/0200253 A1 | 9/2006 | Hoffberg et al. | |
| 2007/0022442 A1 | 1/2007 | Gil et al. | |
| 2007/0038516 A1 | 2/2007 | Apple et al. | |
| 2007/0060099 A1 | 3/2007 | Ramer et al. | |
| 2007/0060109 A1 | 3/2007 | Ramer et al. | |
| 2007/0060114 A1 | 3/2007 | Ramer et al. | |
| 2007/0060129 A1 | 3/2007 | Ramer et al. | |
| 2007/0060136 A1 | 3/2007 | Ramer et al. | |
| 2007/0060173 A1 | 3/2007 | Ramer et al. | |
| 2007/0061197 A1 | 3/2007 | Ramer et al. | |
| 2007/0061198 A1 | 3/2007 | Ramer et al. | |
| 2007/0061211 A1 | 3/2007 | Ramer et al. | |
| 2007/0061229 A1 | 3/2007 | Ramer et al. | |
| 2007/0061242 A1 | 3/2007 | Ramer et al. | |
| 2007/0061243 A1 | 3/2007 | Ramer et al. | |
| 2007/0061244 A1 | 3/2007 | Ramer et al. | |
| 2007/0061245 A1 | 3/2007 | Ramer et al. | |
| 2007/0061246 A1 | 3/2007 | Ramer et al. | |
| 2007/0061247 A1 | 3/2007 | Ramer et al. | |
| 2007/0061300 A1 | 3/2007 | Ramer et al. | |
| 2007/0061301 A1 | 3/2007 | Ramer et al. | |
| 2007/0061302 A1 | 3/2007 | Ramer et al. | |
| 2007/0061303 A1 | 3/2007 | Ramer et al. | |
| 2007/0061317 A1 | 3/2007 | Ramer et al. | |
| 2007/0061328 A1 | 3/2007 | Ramer et al. | |
| 2007/0061331 A1 | 3/2007 | Ramer et al. | |
| 2007/0061332 A1 | 3/2007 | Ramer et al. | |
| 2007/0061333 A1 | 3/2007 | Ramer et al. | |
| 2007/0061334 A1 | 3/2007 | Ramer et al. | |
| 2007/0061335 A1 | 3/2007 | Ramer et al. | |
| 2007/0061336 A1 | 3/2007 | Ramer et al. | |
| 2007/0061363 A1 | 3/2007 | Ramer et al. | |
| 2007/0066364 A1 | 3/2007 | Gil et al. | |
| 2007/0118520 A1 | 5/2007 | Bliss et al. | |
| 2007/0156522 A1 | 7/2007 | Carpenter et al. | |
| 2007/0157227 A1 | 7/2007 | Carpenter et al. | |
| 2007/0159522 A1 | 7/2007 | Neven | |
| 2007/0184855 A1 | 8/2007 | Klassen | |
| 2007/0291710 A1 | 12/2007 | Fadell | |
| 2008/0005668 A1 | 1/2008 | Mavinkurve et al. | |
| 2008/0189360 A1 | 8/2008 | Kiley et al. | |
| 2008/0288983 A1* | 11/2008 | Johnson et al. | 725/46 |
| 2012/0042006 A1 | 2/2012 | Kiley | |

FOREIGN PATENT DOCUMENTS

| | | |
|---|---|---|
| EP | 1329056 | 7/2003 |
| JP | 10013961 | 1/1998 |
| WO | 9859506 | 12/1998 |
| WO | 0029979 | 5/2000 |
| WO | 0050844 | 8/2000 |
| WO | 01/19102 | 3/2001 |
| WO | 0217567 | 2/2002 |
| WO | 2005/091568 | 9/2005 |

OTHER PUBLICATIONS

Non-Final Rejection for U.S. Appl. No. 12/960,027 mailed Dec. 8, 2011.
Wireless Application Protocol. Wikipedia. http://en.wikipedia.org/wiki/Wireless_Application_Protocol. 7 pgs.
WebCab.de. Products. http://webcab.de/wbhhe.xhtml. 2 pgs.
R. Fielding et al., "Hypertext Transfer Protocol—HTTP/1.1" Network Working Group. 114 pages.
ISR & Written Opinion for PCT Application No. PCT/US08/53220, mailed Jul. 21, 2008.
HTTP State Management Specification. Wireless Application Protocol. Dec. 13, 2000. 13 pgs.
Damiani, E., et al. "Privacy Enhanced Authorizations and Data Handling." Universita degli Studi di Milano, Dipartimento di Tecnologie dell"Informazione. 6 pgs.
IBM Tivoli Privacy Manager. "Solutio Design and Best Practices." IBM. 274 pgs.
Hypertext Transfer Protocol—Next Generation Overview. "(Proposed) HTTP-NG Working Group." http://www.w3org/Protocols/HTTP-NG/. 3 pgs.
Geetys, J., et al. "The WebMUX Protocol." http://www.w3org/Protocols/MUX/WD-mux-980722.html. Aug. 1, 1998. 23 pgs.
Janssen, Bill. "wing: Binary Wire Protocol for HTTP-ng." http://www.w3org/Protocols/HTTP-NG/1998/08/draft-janssen-httpng-wire-00.txt. 20 pgs.
Larner, Dan. "HTTP-NG Web Interfaces." hftp://www.w3org/Protocols/HTTP-NG/1998/08/draft-larner-nginterfaces-00.txt. Aug. 1, 1998. 30 pgs.
Janssen, B., et al. "HTTP-ng Architectural Model." http://www.w3org/Protocols/HTTP-NG/1998/08/draft-frystyk-httpng-arch-00.txt. Aug. 1, 1998. 20 pgs.
Short-and Long-Term Goals for the HTTP-NG Project. "W3C Working Draft 27—Mar. 1998." http://www.w3org/TR/1998/WD-HTTP-NG-goals. 8 pg.
Nielsen, H. F., et al. "HTTP-NG Overview—Problem, Statement, Requirements, and Solution Outline." http://www.w3org/Protocols/HTTP-NG/1998/08/draft-frystyk-httpng-overview-00. Nov. 17, 1998. 14 pgs.
Design of HTTP-NG Testbed. "W3C Note Jul. 10, 1998." http://www.w3org/TR/NOTE-HTTP-NG-testbed/. 9 pgs.
A Brief Introduction to XACML. http://www.oasis-open.org/committees/download.php/2713/Brief_Introduction_to_XACML.html. 5 pgs.
Enterprise Privacy Authorization Language (EPAL). Technology Reports. http://xml.coverpages.org/epal.html. Jan, 20, 2005. 11 pgs.
Enterprise Privacy Authorization Language (EPAL 1.2). W3C Member Submission Nov. 10, 2003. http://www.w3.org/Submission/2003/SUBM-EPAL-20031110/. 72 pgs.
OWL Web Ontology Language Overview. W3C Recommendation Feb. 10, 2004. http://www.w3.org/TR/owl-features/. 18 pgs.
Hogben, Giles. "Describing the P3P base data schema using OWL." 8 pgs.
Sekiguchi et al., "NaVigation Markup Language (NVML)" W3C Note. www.w3.org/TR/NVML. Aug. 6, 1999. 40 pgs.
Kanemitsu, H., "POIX: Point of Interest eXchange Language Specification." www.w3.org/TR/poix/. W3C Note. Jun. 24, 1999. 36 pgs.
HTIP State Management Specification. Wireless Application Protocol. Dec. 13, 2000. 13 pgs.
WAG UAPROF. Wireless Application Group. User Agent Profile Specification. Version Nov. 10, 1999. 76 pgs.
WAP WAE Specification. Wireless Application Protocol. Wireless Application Environment Specification. Version Apr. 30, 1998. 19 pgs.

(56) References Cited

OTHER PUBLICATIONS

Deja News—Trademark, Disclaimer, and Our Position on Use net Privacy. http://web.archive.org/web/19961223144218/http://www.dejanews.com/dndn.html. 3 pages.

Composite Capability/Preference Profiles (CC/PP): Structure and Vocabularies 2.0. W3C Working Draft Apr. 30, 2007. http://www.w3.orgITRI2007/WD-CCPP-struct-vocab2-20070430/. 55 pages.

Composite Capability/Preference Profiles (CC/PP): Structure and Vocabularies 1.0. W3C Recommendation Jan. 15, 2004. http://www.w3.orgITR/CCPP-struct-vocab/. 65 pages.

CC/PP exchange protocol based on HTIP Extension Framework. W3C Note Jun. 24, 1999. http://www.w3.org/1999/06/NOTE-CCPPexchange-19990624. 20 pages.

Tacoda Launches Consumer Choice Initiative. http://findarticles.com/p/articles/mi_pwwi/is_2006111aLn16822776/. Nov. 2006. 2 pages.

Network Advertising Initiative. Self-Regulatory Principles for Online Preference Marketing by Network Advertisers. http://www.ftc.gov/os/2000/07/NAI%207-10%20Final.pdf. 21 pages.

Jennings, C. "Private Extensions to the Session Initiation Protocol (SIP) for Asserted Identity within Trusted Networks." Network Working Group. https://www.ietf.org/rfc/rfc3325.txt. 17 pages.

The Platform for Privacy Preferences 1.1 (P3P1.1) Specification. W3C Working Group Note Nov. 13, 2006. http:/www.w3.orgITRIP3P11/. 181 pages.

The Platform for Privacy Preferences 1.0 (P3P1.0) Specification. W3C Recommendation Apr. 16, 2002. http://www.w3.orgITRIP3P/. 122 pages.

* cited by examiner

# UNSOLICITED COOKIE ENABLED CONTEXTUAL DATA COMMUNICATIONS PLATFORM

CROSS-REFERENCE TO RELATED APPLICATIONS

This application claims the benefit of priority of U.S. Provisional Patent Application No. 61/514,020, filed Aug. 1, 2011, and is a continuation-in-part of U.S. patent application Ser. No. 13/442,609, filed Apr. 9, 2012, which is a continuation of U.S. patent application Ser. No. 12/960,027, filed Dec. 3, 2010, now U.S. Pat. No. 8,156,206, which is a continuation of U.S. patent application Ser. No. 12/016,996, filed Jan. 19, 2008, now U.S. Pat. No. 7,873,710, which claims the benefit of U.S. Provisional Application No. 60/888,318, filed on Feb. 6, 2007, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2011-2012 5o9, Inc.

BACKGROUND

1. Field

Embodiments of the present invention generally relate to Internet communications and mechanisms that enable contextual data to be exchanged between web clients and web servers. More specifically, embodiments of the present invention provide infrastructure and both client and server-side functionality to enable location data, device capabilities, operating system capabilities and user data to be selectively, securely, efficiently and cost-effectively delivered over any web connection between a web-enabled device and a web server and/or web services, thereby enabling various business usage models, such as local search, local advertising, location-based services, privacy, on-line identity solutions, mobile asset management, mobile data policy management, mobile coupons, proximity marketing, personalized content, permission marketing and closed-loop virtual/physical marketing among others.

2. Description of the Related Art

Enterprise customers need a simple and cost-effective solution that enables their customers, partners, suppliers, vendors, employees and others to transmit real-time location, device, network, user and user preference data over the Internet to support device optimized, network optimized and personalized content and services. Users want a better experience and control over their privacy. Businesses need a cost-effective, efficient way of supporting mobile employees, delivering location-based services, and properly formatted, relevant content to their customers. They need to do all of this regardless of the device or network connection. Current solutions and services require high CAPEX/OPEX commitments and don't offer persistence across different networks.

On the other side of the value chain, consumers using mobile devices are subjected to a poor user experience in terms of data entry, latency and content formatting—creating unnecessary transactional friction. Additionally, the advent of mobile marketing exposes consumers to unwanted interruptions. They are demanding technologies that are convenient, yet still give them privacy and control over their privacy. The issues of convenience, privacy and control must be addressed before businesses and consumers can fully realize the economic and social benefits of the mobile Web.

SUMMARY

Systems and methods are described for an unsolicited cookie enabled contextual data platform. According to one embodiment, an Internet-enabled mobile device is provided including a non-transitory storage device and one or more processors. The non-transitory storage device has embodied thereon instructions associated with a context management routine. The processors are coupled to the non-transitory storage device and operable to execute the instructions associated with the context management routine to perform a method for reconfiguring a browser menu of the Internet-enabled mobile device. A HyperText Transport Protocol (HTTP) request is transmitted to a server device relating to a service supported by the server device. The HTTP request contains therein an unsolicited cookie including data indicative of (a) information regarding an end user of the Internet-enabled mobile device, (b) information regarding the Internet-enabled mobile device, (c) information regarding a location of the Internet-enabled mobile device and/or (d) information regarding a network to which the Internet-enabled mobile device is connected. Responsive to the HTTP request, a HyperText Markup Language (HTML) file is received from the server device. The HTML file has embedded therein contextual menu information based on the service and the unsolicited cookie. The contextual menu information is extracted from the HTML file. End user interaction with the service is then customized by dynamically reconfiguring a browser menu of the Internet-enabled mobile device based on the contextual menu information.

According to another embodiment, a server device is provided including a non-transitory storage device and one or more processors. The non-transitory storage device has embodied thereon instructions associated with a context management routine. The processors are coupled to the non-transitory storage device and operable to execute the instructions associated with the context management routine to perform a method for reconfiguring a browser menu of an Internet-enabled mobile device. A HyperText Transport Protocol (HTTP) request relating to a service supported by the server device is received from the Internet-enabled mobile device. The HTTP request contains therein an unsolicited cookie including data indicative of (a) information regarding an end user of the Internet-enabled mobile device, (b) information regarding the Internet-enabled mobile device, (c) information regarding a location of the Internet-enabled mobile device and/or (d) information regarding a network to which the Internet-enabled mobile device is connected. Contextual menu information is generated based at least in part on the unsolicited cookie. The Internet-enabled mobile device is caused to dynamically reconfigure a browser menu of the Internet-enabled mobile device by returning to the Internet-enabled mobile device, responsive to the HTTP request, a HyperText Markup Language (HTML) file having embedded therein the contextual menu information.

According to yet another embodiment, a method is provided for conveying information to a web server regarding a current privacy setting. A user agent running on an Internet-enabled device causes to be stored information indicative of a current privacy setting. A navigation request relating to a resource associated with the web server is received by the user agent. Responsive to the navigation request, a HyperText Transport Protocol (HTTP) request is generated in which a value associated with an HTTP header field of the HTTP request is set based on the current privacy setting. The HTTP request is then transmitted to the web server to request the web server to return to the user agent content associated with the resource.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
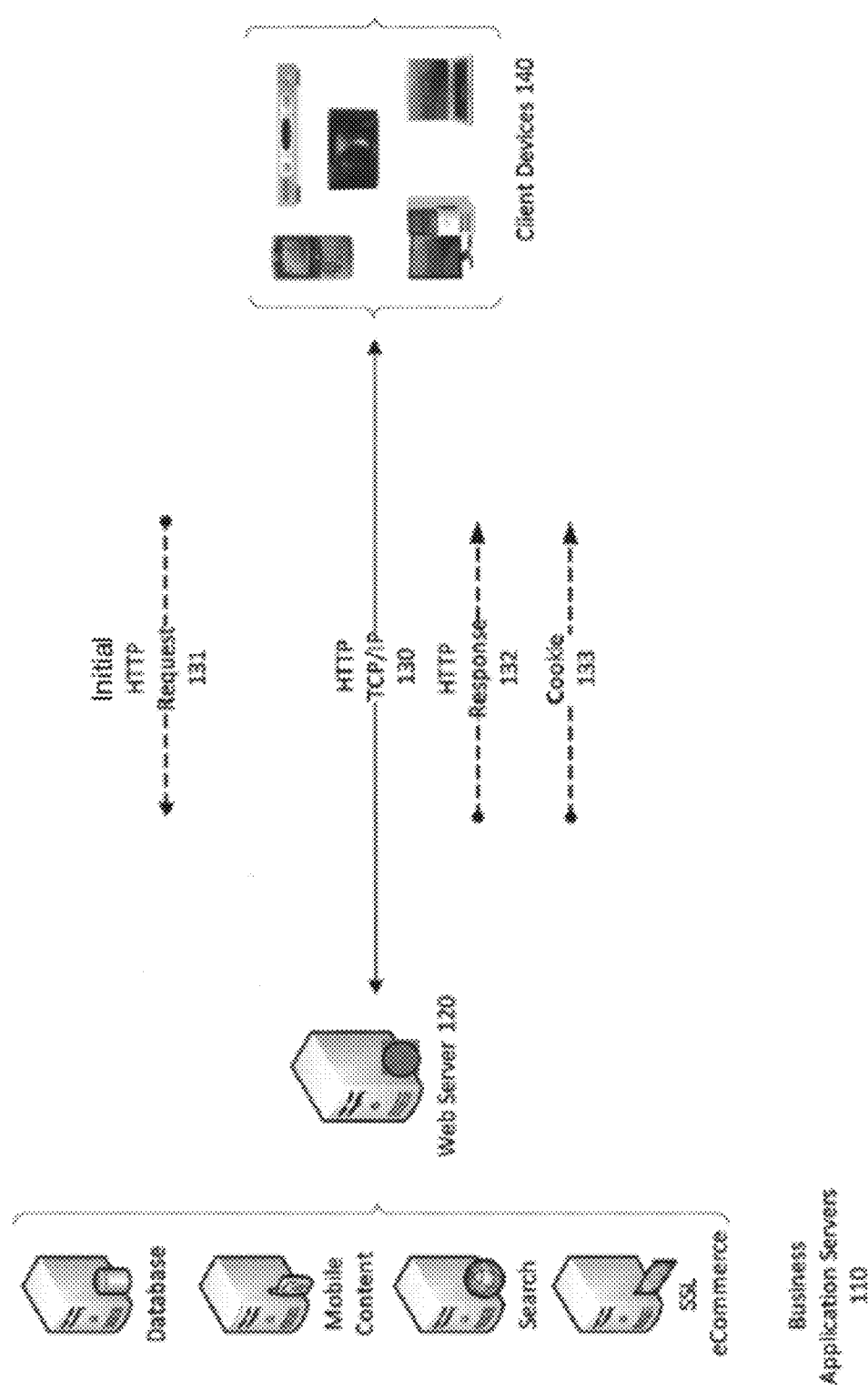
FIG. 1 is a conceptual illustration of the current communication convention used by HyperText Transport Protocol (HTTP) clients and HTTP servers in relation to an initial HTTP request from an HTTP client to an HTTP server.

Systems and methods are described for enabling the exchange and usage of contextual information among web-enabled clients and servers. According to one embodiment, contextual information, e.g., dynamic state information, is aggregated, stored and protected on a client device. The contextual information may then be transmitted to a web server for the purpose of, among other things, allowing the web server to generate and provide dynamic contextual menu information to the client device to enable the client device to, among other things, present contextual menus to facilitate end-user interaction with a particular application or web service.

According to various embodiments of the unsolicited Cookie enabled contextual data communications platform as described herein, techniques are provided that can be used to allow client-side device or context information to be supplied to a web server, for example, prior to an initial content response from the web server. This technique is referred to herein as "Unsolicited Cookies." The approach described herein is user agent (e.g., browser) initiated vs. Origin server initiated. As such, "metadata" or "stateful data" can be supplied to the web server prior to the server responding to the initial HTTP request.

In one embodiment of the present invention, web-connected devices securely interact with web servers based on information regarding who (e.g., the user), what (e.g., the device), where (e.g., the global positioning system (GPS) location, Wi-Fi, cell tower) and when (e.g., time) over any carrier or network while also protecting the privacy of the users. According to various embodiments of the contextual data communication platform described herein, software components distributed between a web-enabled client and a web server use existing Internet standards to cost-effectively deliver business critical location, device and user data from web-enabled client devices, such as Smartphones, Pocket Personal Computers (PCs), Ultra Mobile PCs (UMPCs), BlackBerry® wireless handheld devices, iPhones, desktop/laptop computers, set top boxes and the like, to a web server over any web connection. Relevant portions of this who, what, where and when data can then be distributed in real-time to any application or service to enhance the user experience. (5o9 is a registered trademark of 5o9, Inc. of Boulder, Colo.).

As a result of the device-, user- and location-awareness provided to content and service providers by embodiments of the present invention, numerous data usage models, such as local search, local advertising, location-based services, privacy, on-line identity solutions, mobile asset and policy management, mobile content, personalized content and the like, become feasible. For example, a novel permission-based proximity marketing approach (Pushing with Permission) provides users with control over their data privacy, reduces data entry and increases relevant interactions. As one potential permission-based marketing scenario, Taco Bell may perform a drive time promotion in which customers who give Taco Bell permission to contact them on their Pocket PC will receive a notice when they are within five miles of a Taco Bell offering them a free taco when they buy two if they come by the drive thru window within a designated time frame. As described further below in the context of various exemplary use cases, a user may provide a service provider (e.g., Taco Bell) with permission to solicit them by making available selective who, what and/or where data to the service provider. For purposes of illustrating the versatility of various embodiments of the contextual data communication platform, additional use cases and examples are described below.

In one embodiment, by way of newly available email security/data access policy management, organizations with sensitive information or that must meet regulatory compliance standards for data release and distribution can now address the unique challenges of mobile users. The user, their location, the device they are on and in some cases, the network or software they are using to connect to the Internet may be used to determine what networks or data may be accessed or sent via email.

In accordance with various embodiments, mobile asset tracking can be provided to allow organizations with the ability to instantly know where field or traveling employees are or to locate missing or stolen GPS-enabled mobile devices. For example, server-initiated calls can instantly provide an asset management, HR system or database with identifying device, user and location data. Additionally, client software can be "locked-down" to ensure unauthorized users cannot turn GPS data off.

According to one embodiment of the present invention, home/away profiles are enhanced. For example, the client may be customized to allow employees with non-GPS enabled mobile devices to change their settings for frequently visited locations. Single-click controls may also simplify the process, thereby increasing field policy compliance and productivity.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, MultiMedia Cards (MMCs), secure digital (SD) cards, such as miniSD and microSD cards, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, various embodiments of the present invention may be described with reference to handheld, mobile devices or phones, the present invention is also applicable to various other Web-enabled devices (mobile or fixed), such as laptop and/or desktop computers and the like. Embodiments of the present invention described herein may be installed on any device that transmits data via HTTP, such as Desktop Computers, Laptops, Mobile Phones, Smartphones, Pocket PCs, PDAs, Video Phones, Ultra Mobile PCs (UMPCs), hand-held computers, Appliances (such as refrigerators, washers), consumer electronics devices (such as game consoles TVs, set-top boxes, home media centers, DVRs, stereos, digital audio and video players/recorders), military hardware (walkie talkies, satellite phones, tanks, remote vehicles, scanners), vehicles (automobiles, aircraft, space craft, trains, buses) and other devices (e.g., seismic or other environmental sensors and robots) and the like. Additionally, a pure software embodiment is envisioned for client devices in which all or a subset of the features described below may be implemented.

For the sake of illustration, various data and business use cases are described herein to illustrate exemplary applications of the novel contextual data communication platform. Importantly, such example data and use cases are not intended to be limiting as the software infrastructure and flexible data communications and transport mechanisms described herein enable and facilitate an indescribably vast assortment of new and improved web services and applications.

Similarly, embodiments of the present invention are described in the context of a mobile browser, but those skilled in the art will recognize the applicability to user agents more generally.

Finally, while embodiments of the present invention are described with reference to particular data being embedded in HTTP protocol headers (e.g., the standard cookie request header), in alternative embodiments, HTTP X-headers may be used in addition to or instead of the regular fields in the HTTP header.

TERMINOLOGY

Brief definitions of terms, abbreviations, and phrases used throughout this application are given below.

The phrase "augmented HyperText Markup Language file" or "augmented HTML file" generally refer to an HTML file supplemented to include information regarding a menu structure to be presented on the client device to which the augmented HTML file is directed. According to one embodiment, the information regarding the menu structure received in the augmented HTML file is used to dynamically reconfigure the menu information/structure presented by the operating system and/or an application running on the client device. Advantageously, in this manner, many dynamic contextual menu usage models are enabled. In one embodiment, dynamic browser menus of a mobile device are driven from a web server.

The term "client" generally refers to a requesting program, process or device in a client/server relationship. Examples of clients include browsers, browser plug-ins, and/or other applications using HTTP to communication with a Web server. For example, a Web browser is effectively making client requests for pages from servers all over the Web. The browser itself is a client in its relationship with the computer that is getting and returning the requested markup language file (e.g., HTML/XML/XHTML file). The computer handling the request and sending back the markup language file is functioning as server with respect to the Web browser. Notably, a device typically thought of as a client device may also function as a server and may concurrently operate as both a client and a server with respect to other devices to which it is communicatively coupled.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The phrases "Me data," "Me information," "contextual data," "contextual information," "dynamic state information"

and the like generally refer to information regarding who the user is (e.g., name, address, phone number, gender, personal advertising preferences, personal privacy preferences, social advertising preferences, the skill level of the user with respect to one or more web services or applications (e.g., novice, expert, etc.)), what the client device, operating system and/or terminal capabilities are (e.g., screen resolution, color capabilities, accepted compression, etc.), where the client device is (e.g., GPS, Zip/postal code, Bluetooth, Wi-Fi, area code, country, near field communications, radio frequency ID (RFID), cell tower triangulation, device, virtual location—hyperlinks any other method of determining location and/or when (e.g., time).

The phrase "protected fields" generally refers to the ability to selectively enable or disable the transmission of information, such as Me data, via a web connection. In one embodiment, protected fields provide the underpinnings of a privacy-based user interface, which supports the concept of Pushing with Permission. In one embodiment, protected fields technology is executed via a user-controlled identification (e.g., the ability to check/uncheck data fields) versus tracking approach to sharing content, services and advertising personalization (who, what & were) data.

The term "responsive" includes completely or partially responsive.

The term "server" generally refers to a responding program, process or device in a client/server relationship. For example, a web server responds to client (e.g., web browser) requests for pages from web-connected clients. The web server itself is a server in its relationship with the computer or program that is making requests for markup language files (e.g., HTML/XML/XHTML files) and does not assume any particular hardware or device form factor. The computer or program making the requests is functioning as a client with respect to the web server. Notably, a device typically thought of as a server device may also function as a client and may concurrently operate as both a client and a server with respect to other devices to which it is communicatively coupled. Consequently, depending on the context, when the phrase client-server is used herein it may also encompass peer-to-peer functionality as well.

The phrase "unsolicited cookie" generally refers to a cookie originated by an HTTP client (user agent) and sent to an HTTP server. According to one embodiment, unsolicited cookies are used to provide to the HTTP server real-time metadata stored in an encrypted database on the client device. The real-time metadata may include information relating to one or more of "Me data," location information, network information, device data, terminal capabilities, operating system capabilities, user data, privacy preferences (e.g., do not track settings (DNT-field-value), site-specific exceptions, user-granted exceptions, DNT-extension, privacy level and the like) and time information. For example, an unsolicited cookie may communicate to the HTTP server (i) information regarding who the user is (e.g., personally identifying data (such as, but not limited to names, addresses, phone numbers, email addresses, social security number (SSN), national ID number, employee number and credit card account information), personal interest data (such as, but not limited to, food, music, leisure, technology, entertainment preferences, personal advertising preferences (e.g., frequency capping and/or time capping), data sharing preferences, tracking preferences (e.g., relating to how data about the end user will be collected (data collection) and/or how it will be used (targeted advertising)), social networking preferences and demographic data (such as, but not limited to age, gender, income, spending, employment, profession, household income, education level, number of children, number of people in the household, marital status, sexual orientation, political affiliation, ethnicity, group memberships, etc.); (ii) what the client device and/or terminal capabilities are (e.g., screen resolution, color capabilities, accepted compression, audio and video formats, etc.); (iii) information indicating where the client device is, such as, but not limited to real-time GPS location of the client device from which the request originated; other static or dynamic state information associated with the client device (such as, but not limited to, screen orientation, a device ID (e.g., the unique PIN number of a BlackBerry device), whether the client is a real device or simulator, whether the device is holstered or not at the time of the request), and state information associated with external or internal sensors or monitors, including, but not limited to gyro status, humidity, temperature, etc.

The phrase "user agent" generally refers to any client program capable of initiating HTTP requests, including, but not limited to browsers, spiders (web-based robots), command-line tools, native applications and mobile apps.

Technical Background

At its core the Internet is designed to function in a client-server mode. The governing body, the World Wide Web Consortium (W3C), designed a set of specifications that allow data to traverse the Internet interacting between the web server and the browser. This document known as RFC 2616 discusses the communication protocol in use today, i.e., Hypertext Transfer Protocol (HTTP).

HTTP is a method used to transfer or convey information on the World Wide Web. Its original purpose was to provide a way to publish and retrieve Hyper Text Markup Language (HTML) pages. Development of HTTP was coordinated by the W3C and the Internet Engineering Task Force (IETF), culminating in the publication of a series of RFCs, most notably RFC 2616 (1999), which defines HTTP/1.1, the version of HTTP in common use today and which is hereby incorporated by reference herein for all purposes.

HTTP is a request/response protocol between clients and servers. The originating client, such as a web browser, spider, or other end-user tool, is referred to as the user agent. The destination server, which stores or creates resources such as HTML files and images, is called the origin server. In between the user agent and origin server may be one or more intermediaries, such as routers, network appliances, proxies, gateways, firewalls and the like. References to HTML herein refer to current, past and/or future HTML standards including, but not limited to, HTML 4, HTML 4.01, HTML5 and the like.

FIG. 1 is a conceptual illustration of the current communication convention used by HyperText Transport Protocol (HTTP) clients and HTTP servers in relation to an initial HTTP request from an HTTP client to an HTTP server. Before describing the various innovations and features of embodiments of the present invention, it is thought to be helpful to provide a bit of background regarding the current mechanism used for communicating static client state information to web servers and related drawbacks and limitations of the current approach.

In this example, an HTTP client running on one of client devices 140 initiates an HTTP request 131 by establishing a Transmission Control Protocol (TCP) connection to a particular port on a web server 120 (port 80 by default). An HTTP server listening on that port waits for the HTTP client to send the HTTP request 121. Upon receiving the HTTP request 132, the web server 120 sends back an HTTP response 132, including a status line, such as "HTTP/1.1 200 OK", and a message of its own, the body of which is perhaps the requested file, an error message, or some other information.

HTTP can occasionally pose problems for web developers (Web Applications), because HTTP is stateless. (A stateless server is a server that treats each request as an independent transaction that is unrelated to any previous request.) The advantage of a stateless protocol is that hosts don't need to retain information about users between requests, but this forces the use of alternative methods for maintaining users' state, for example, when a host would like to customize content for a user who has visited before.

The common method used by current technology for solving this problem of statelessness involves the use of sending and requesting cookies, such as cookie 133, in an attempt to add state. However, in accordance with current usage scenarios pursuant to RFC 2109, which is hereby incorporated by reference in its entirety for all purposes, cookies are originated only by the "origin server" (i.e., web server 120 in the current example).

HTTP cookies, such as cookie 133, sometimes known as web cookies or just cookies, are parcels of text, which are used by web servers to differentiate among users and to operate in a way that depends on the user. Cookies are set by the "origin server," stored by the web browser and then sent back unchanged by the browser each time it accesses that server. HTTP cookies are used for authenticating, tracking, and maintaining specific information about users, such as site preferences and the contents of their electronic shopping carts.

Allowing users to log in to a web site with a username and password is another use of cookies. Users typically log in by inserting their credentials into a login page; cookies allow the server to know that the user is already authenticated, and therefore is allowed to access services or perform operations that are restricted to logged-in users.

Several websites also use cookies for personalization based on users' preferences. Sites that require authentication often use this feature, although it is also present on sites not requiring authentication. Personalization includes presentation and functionality. For example, the Wikipedia web site allows authenticated users to choose the webpage skin they like best; the Google search engine allows users (even non-registered ones) to decide how many search results per page they want to see. Notably, while not contrary to RFC 2109, cookies are not originated by HTTP clients. That is, unless an unexpired cookie exists for the server at issue (that was set by the server during a previous interaction with the server), the HTTP client does not send a cookie to the server.

Having now briefly explained the state-of-the-art in connection with attempting to use state information on the web as well as numerous disadvantages and limitations associated with current conventions for web connections, the improvements provided by embodiments of the present invention will now be better understood.

Summary of Various Features of Embodiments of the Present Invention

Embodiments of the present invention seek to address or at least alleviate various problems with current conventions for web connections by providing one of more of the following features:
The ability to aggregate, store and protect contextual data on a client device.
The ability to transmit contextual data, including user's state information, while allowing the user to retain control of their privacy.
The ability to transmit any kind of data either static or dynamic using the HTTP protocol and the HTTP headers.
The ability to transmit contextual information to a client device based upon which the client device may display contextual menus.
The ability to transmit any kind of data from a web server to a client device using augmented HTML files.
The ability to personalize content and/or the format in which it is delivered to the client device based on the contextual data provided by the client device. For example, a web server may be directed to return to a web browser first or third-party content (e.g., a targeted ad) associated with a navigation request that is tailored or composed in accordance with current privacy and/or advertising personalization settings (e.g., tracking and/or data sharing preferences) established by the end user.
The ability to provide a contextual data communication platform without a change to the specifications (e.g., RFC 2616 and RFC 2109)
The ability to optimize data transfer or transmission using different compression algorithms within a single software solution In accordance with various embodiments of the present invention, the features listed above are provided by way of one or more of the following technological enhancements, which are described in further detail below:
1. Client-side browser helper object and control panel application which can interface with all standard HTTP browsers and facilitate, among other things, the injection of dynamic contextual state information into the HTTP protocol and the presentation of dynamic contextual menus on the client device responsive to tagged data sent by the web server.
2. Web Server modules, which extract and distribute the dynamic state information to appropriate information servers and embed contextual menu information in augmented HTML files.
3. Origination of cookies by HTTP clients—Unsolicited cookies containing Me data (e.g., real-time state data) can be originated by HTTP clients thereby allowing clients to essentially initiate a stateful session with an HTTP server.
4. Adaptive Compression Architecture—the ability to support and manage with rule sets, multiple compression CODECs, such as Gzip, Bz2 and the like, within one client-server application.
5. Bi-Directional Communications
    a. On-device bidirectional communication of Me data between the mobile aware development platform and other resident applications.
    b. Adaptive Messaging Architecture initiates bi-directional communications across HTTP—effectively allowing the server to request more information from the client before completing the transaction.

Background Information Regarding Who, What and where

Before discussing various implementation details of various embodiments of the present invention, it is thought to be useful to provide background information regarding various forms of contextual data that may be transmitted from a client device to a web server.

A first form of contextual data that may be transmitted to a web server is personal information, such as user identification information—"who" information. User identification is critical to efficient mobile Internet communications. Filling out a Web form on a Smartphone or Pocket PC is slow and frustrating and restricts mobile commerce. In accordance with one embodiment of the present invention, a solution is one or more databases of "Me" information. For example, one or more encrypted data files, which provide information regarding device capabilities, operating system capabilities and other personal data that the user is willing to share (e.g., directly with a target web server or indirectly with other web servers) may be stored on the device. Such Me information may then allow a device to authenticate the user with Web servers, without sending personal information over the Web. The Me information may be used to fill out forms and remember what kind of information or advertising the user is willing to accept. This level of personalization enables widespread use of online CRM, e-commerce, targeted advertising, social networking and permission-based marketing. By delivering information in a personalized, appropriately formatted manner, content providers can deliver greater relevance and value to customers, leading to enhanced service levels, increased loyalty, and improved revenues.

A second form of contextual data that may be transmitted to a web server includes information regarding device, operating system and terminal capabilities—"what" information. The assumption has always been that a desktop PC is the device connected to the Internet or server. This is no longer the case. As a result, in accordance with various embodiments of the present invention, mechanisms are provided to allow web-connected devices to transmit their capabilities, such as screen size, color display, operating system capabilities, storage device connectivity and content acceleration capabilities. While most larger web sites can determine if it's a mobile device making a request, the vast majority of web sites cannot. And knowing what, only addresses content format, not acceleration or encryption capabilities, remaining battery life, network performance or device health. By marrying who and what together, the server can determine data access policy rules and the user can authenticate to the device first rather than the remote server—turning authentication into a single-step, no-entry process, which saves time, reduces keystrokes, and eliminates the need to send passwords, logins and other sensitive data over the web. With some mobile devices already including fingerprint readers or other biometric devices, the synergies of who and what together creates a more trusted mobile Internet.

A third form of contextual data that may be transmitted to a web server includes information regarding the client device's current location—"where" information. Mobile computing has changed the Internet landscape. Not only are the device capabilities different, buy they are now free to roam. There are many emerging markets where people do not have a PC and will never own one. This directly impacts one of the most popular applications on the Internet—namely Search. Search on a desktop is about browsing. Search on a mobile device is about finding. Knowing the location of a mobile device is a critical determiner of the quality of the results. For instance a mobile search for Pizza Huts should be able to accurately locate all the Pizza Hut stores within walking or delivery distance of the user's current location. The ability to correlate this data with both "What Am I" (what type of device the request originated from) and "Who Am I" (relevant information regarding the end user of the device) allows for the desired customer experience. No more frustration.

Figure 2:
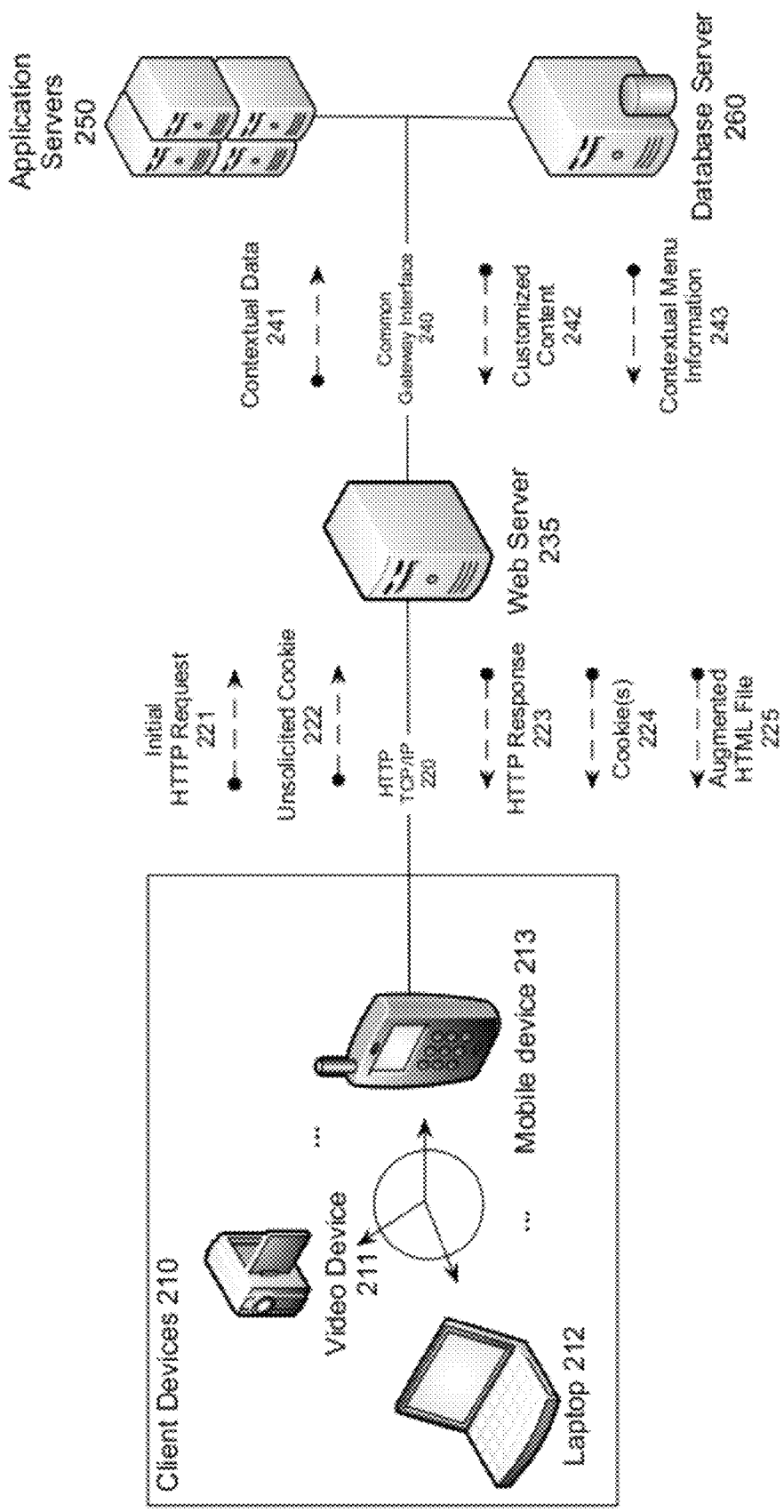
FIG. 2 is a high-level block diagram conceptually illustrating a communication convention among client devices and a web server in accordance with an embodiment of the present invention.

With this background in mind, a high-level view of a contextual data communication platform will now be described with reference to FIG. 2. FIG. 2 conceptually illustrates a new communication convention among client devices 210 and a web server 235 in accordance with an embodiment of the present invention. Notably, the new communication convention provides for the ability on the part of client devices 210 to transmit dynamic state information to a web server 235 via an unsolicited cookie 222. Information servers, such as application servers 250 and/or database server 260 may then customize the output intended to be returned to client devices 210 based on the contextual data provided by the client devices 210. The new communication convention also independently provides the information servers with the ability to return contextual information to the client devices 210. In some embodiments, the contextual information provided by an information server to a client device is for the purpose of facilitating the client device's interactions with the information server. For example, in one embodiment, the web server 235 may return on behalf of the information servers tagged data indicative of desired menu entries to be displayed on a client device. Such menu entries may enable more efficient navigation or interaction with the information server. Thus, in accordance with embodiments of the present invention, client devices 210 may provide contextual data to information servers and/or web servers and webs servers and/or information servers may separately, independently and/or responsive thereto provide contextual information to client devices.

In the present example, client devices 210 interact with the web server 235 via a communications medium 220 that supports HTTP over TCP/IP. Client devices 210 access applications and web services provided by application servers 250 and database server 260 via the web server 235. While in the present example, for sake of illustration, only three types of client devices 210, i.e., a video device 211, a laptop 212 and a mobile device 212, are shown, it is to be understood that client devices 210 may include any web-enabled client device.

Responsive to navigation requests by end users or applications, in addition to conveying information identifying a web resource and a desired action to be performed on the identified web resource, the client devices 210 also transmit static or dynamic state information to web server 235 within unsolicited cookies (e.g., unsolicited cookie 222), which are included within the headers of HTTP requests (e.g., initial HTTP request 221). In the context of the present example, initial HTTP request 221 may represent a first interaction with web server 235 or an interaction with web server 235 in which the client device has no stored, unexpired cookies associated with the web server 235. As such, unsolicited cookie 222 represents a cookie that has been originated by the client device. In one embodiment, the unsolicited cookie 222 (and/or subsequent cookies sent to the web server 235 from the client devices 210) may be encrypted and/or compressed.

Responsive to the unsolicited cookie 222, web server 235 uses the "stateful" information contained therein to "Set Cookie" (cookie(s) 224) back to the requesting User Agent. Once that Cookie is stored in the Browser then any JavaScript contained within the page response can access that meta data. In this manner, cookies (e.g., unsolicited cookie 222) can be used in place of and/or in addition to augmented HTTP requests as described in U.S. Pat. No. 7,873,710, which is hereby incorporated by reference in its entirety for all purposes.

Briefly, the state information conveyed to web server 235 may represent any information observable or otherwise available to the client device, such as the current temperature, the location of the client device and the end user's blood pressure or heart rate. As described in further detail below, server-side functionality within the web server 235 extracts the state information and conveys it directly or indirectly to the information server (e.g., application servers 250 or database server 260) responsible for handling requests relating to the web resource identified in the HTTP request 221 as contextual data 241.

Based on one or both of the contextual data 241 and the application or web service being accessed by the HTTP request 221, the responding information server (e.g., application servers 250 or database server 260) may customize the content to be returned to the requestor by providing customized content 242 to the web server 235. Typically, the task of such an information server is to respond to requests (in the case of web servers, requests from client web browsers) by returning output. Each time a request is received, the server analyzes what the request asks for, and returns the appropriate output. The two simplest ways, for the server, of doing this are (i) if the request identifies a file stored on disk, return the contents of that file; and (ii) if the request identifies an executable command and possibly arguments, run the command based on the provided arguments and return the corresponding output. Common gateway interface (CGI) protocol 240 defines a standard way of doing the latter. CGI defines how information about the server and the request is passed to the command in the form of arguments and environment variables, and how the command can pass back extra information about the output (such as the type) in the form of headers. How web server 235 passes contextual information 241 in the form of exemplary environment variables, according to one embodiment of the present invention, is described further below and in U.S. Pat. No. 7,873,710.

The responding server may also provide contextual menu information 243 to the requesting client device. Notably, in various embodiments, contextual menu information 243 may take into consideration and be at least in part based on or responsive to contextual data 241. In other embodiments, contextual menu information 243 may be provided independent of contextual data 241 and/or the existence of contextual data 241. The contextual menu information 243 typically specifies a menu structure to facilitate ongoing interaction with the current application or web service by the requesting client device. In this manner, context dependent menu structures may be presented on a mobile device screen to shift navigation off the web page and into a browser menu or operating system menu, as the case may be. Advantageously, in this manner, web pages, applications and web services may be provided with the data and screen space they need to deliver relevant content. Meanwhile, mobile users are provided with a consistent and familiar menu interface—minimizing training and support costs.

When present, server-side functionality within the web server 235 extracts the contextual menu information 243 and embeds the contextual menu information 243 within an augmented HTML file 225. In one embodiment, client-side functionality within the client devices 210 is configured to strip out the embedded contextual menu information prior to rendering the HTML.

The following is an example of contextual menu code that may be included within an augmented HTML file or otherwise returned as part of a server response to an HTTP request from a client:

```
<META NAME="5o9data" CONTENT="
<menu name=toplevel target=primary>
<menuitem text='Hamilton DeSanctis Cha'
action=http://www.hdciplaw.com>
</menu>
">
```

Figures 8A, 8B:
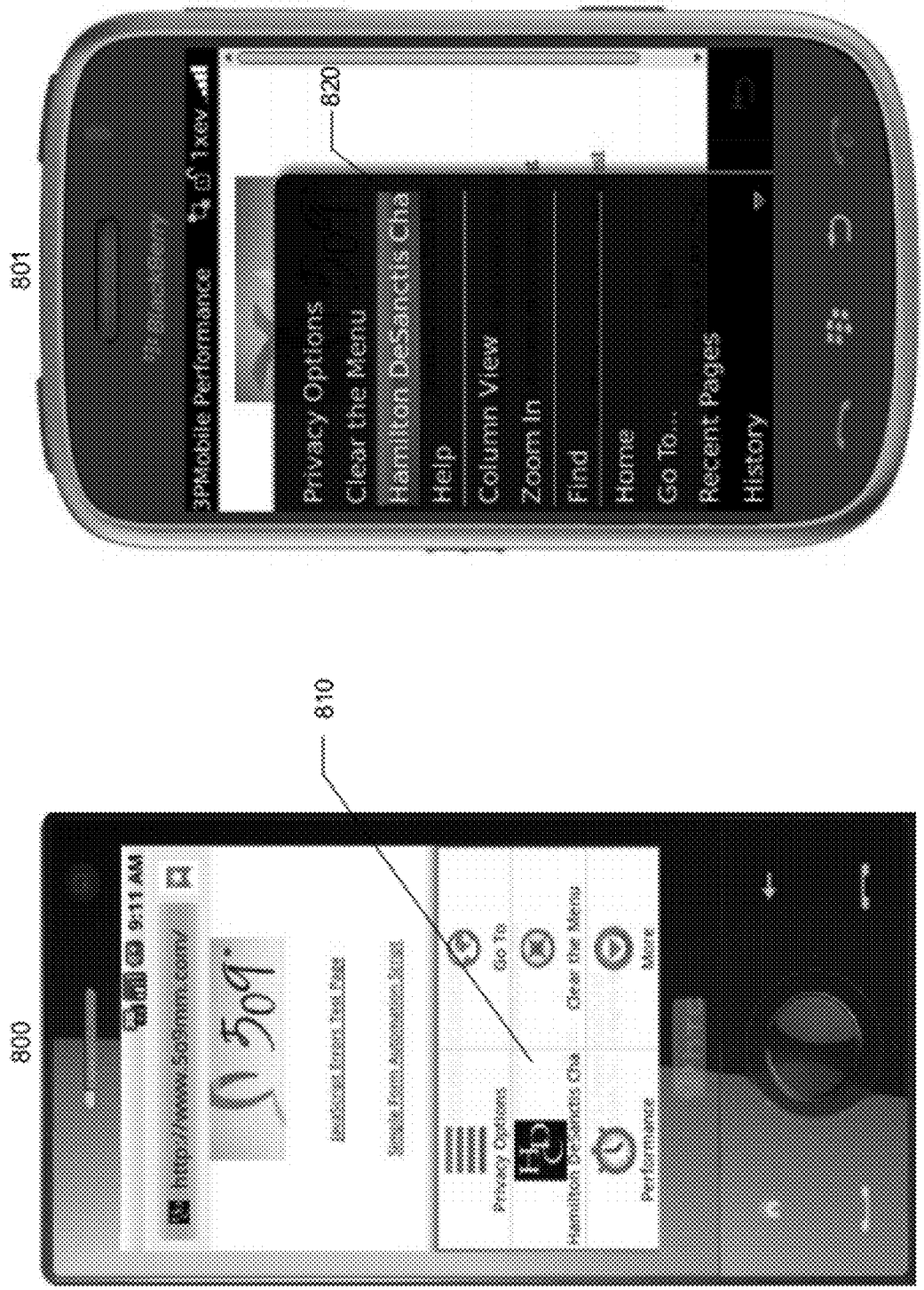
FIG. 8A illustrates the inclusion of a menu entry including graphics in the context of an Android-based mobile device responsive to receipt of dynamically generated contextual menu information from a web server in accordance with an embodiment of the present invention.
FIG. 8B illustrates the inclusion of a text-based menu entry in the context of a BlackBerry mobile device responsive to receipt of dynamically generated contextual menu information from a web server in accordance with an embodiment of the present invention.

According to one embodiment, contextual menu code like that presented above, may produce menus as illustrated in FIG. 8A and/or FIG. 8B. Notably, Android devices, for example, support the ability to add graphics to the menus. Since the web server now has the ability to receive contextual data (e.g., the device's capabilities, such as its graphic's capabilities) from the client device, the contextual menu information can be dynamically generated by the web server based on the device's capabilities. As such, in the examples illustrated by FIG. 8A and FIG. 8B, the Android device 800 includes a menu entry 810 with graphics and the BlackBerry device 801 includes a text-based menu entry 820.

Figure 3:
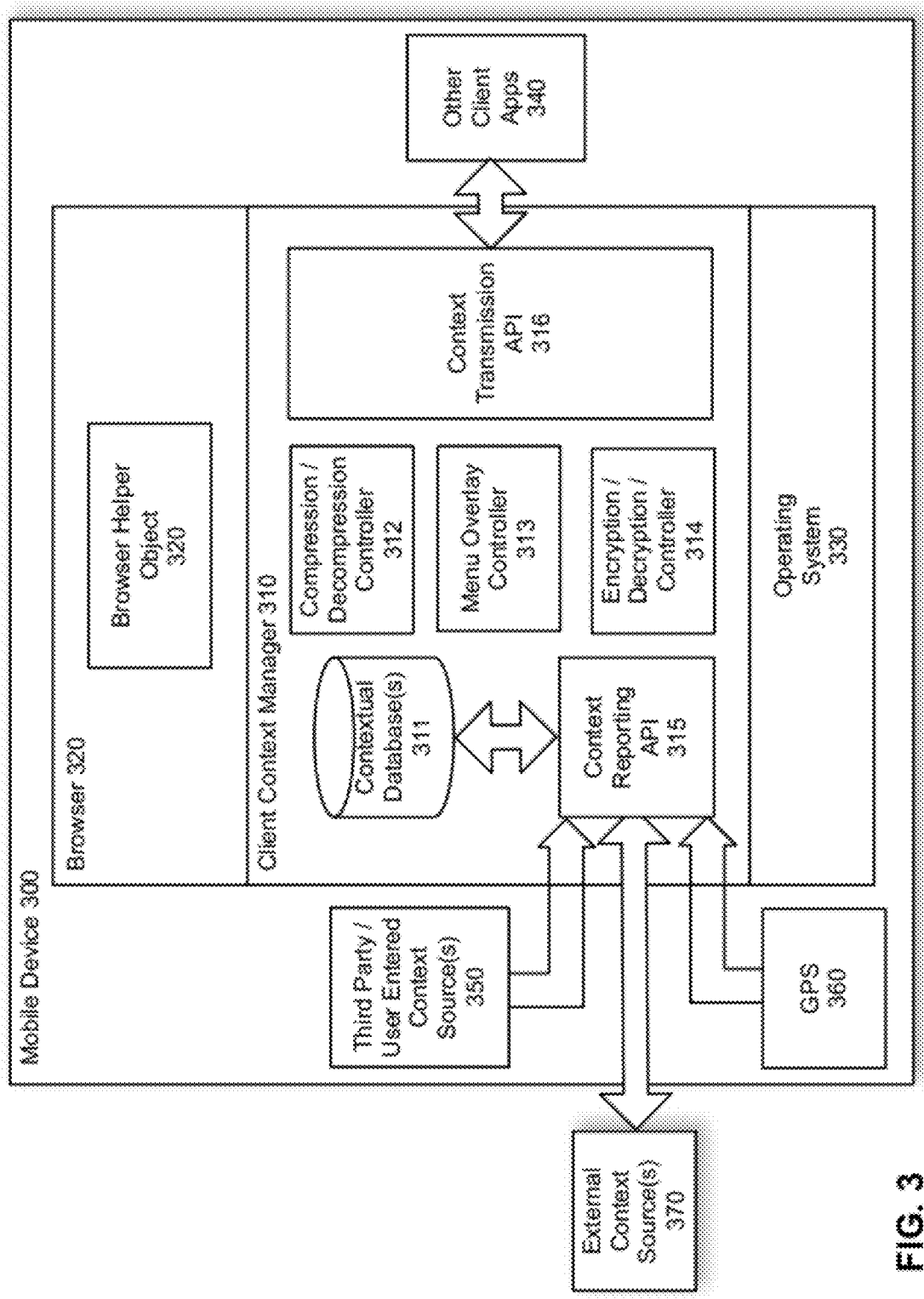
FIG. 3 is a simplified block diagram conceptually illustrating the interactions of various functional units of a mobile device in accordance with an embodiment of the present invention.

FIG. 3 is a simplified block diagram conceptually illustrating the interactions of various functional units of a mobile device 300 in accordance with an embodiment of the present invention. In the present example, mobile device 300 includes a browser 320, a client context manager 310 and an operating system 330.

Browser 320 may be a Microsoft Internet Explorer web browser, such as Internet Explorer Mobile or IE Mobile (formerly referred to as Pocket Internet Explorer or PIE) or other mobile browser, capable of connecting to the web via a cellular network or via wireless local area network—(Wi-Fi) or wide area network (Wi-Max) or other means of connectivity using standard HTTP over TCP/IP. Browser 320 may display web pages written in HTML, HTML5, XHTML Mobile Profile (WAP 2.0), WML (WAP 1.3), iQuery and the like.

According to one embodiment browser 320 includes a browser helper object 321 (or MIME filter) through which client context manager 310 may interface with browser 320. Browser helper object 321 (BHO) may be a Dynamic Link Library (DLL) module designed as a plug-in for Microsoft's Internet Explorer web browser to provide added functionality. In one embodiment, BHO 321 intercepts web content and provides it to client context manager 310 for processing before rendering the associated HTML.

According to the present example, client context manager 310 includes one or more contextual databases 311, a compression/decompression controller 312, a menu overlay controller 313, an encryption/decryption controller 314, a context reporting application programming interface (API) 315 and a context transmission API 316. In one embodiment, client context manager 310 functions as a filter and is implemented in accordance with the Document Object Model (DOM) programming interface specification.

The contextual database(s) 311 may locally store encrypted contextual data, such as information and/or parameters regarding the end-user of the client device, the client device capabilities, terminal capabilities, operating system capabilities, and other third party or user-entered data (e.g., privacy settings, data sharing preferences and/or tracking preference settings (e.g., DNT-field-name, DNT-field-value, DNT-extension and the like)). The latest editor's draft of the W3C's proposed implementation of tracking preference expression, Roy T. Fielding and David Singer. *Tracking Preference Expression (DNT)*. 18 Jul. 2012. W3C Editor's Draft. URL: http://www.w3.org/2011/tracking-protection/drafts/tracking-dnt.html (hereafter the "DNT Working Draft"), defines proposed technical mechanisms for expressing a tracking preference via the DNT request header field in HTTP and is hereby incorporated by reference in its entirety for all purposes.

In one embodiment, contextual database(s) 311 represent one or more extensible, secure databases that run as self contained executable programs on top of the device's target operating system. In the present example, the purpose of contextual database(s) 311 is to collect and store context data from "N" input sources (not shown), e.g., bio-fingerprint reader, GPS, Heart Rate Monitor, Bluetooth devices. According to one embodiment, all of the available context data is stored and updated in real time. Essentially, the contextual database(s) 311 offers a programmer a safe storage location indicating the current state of the target device. As discussed further below, in one embodiment, each field of data that is stored within the database can be individually protected as well as the database itself.

According to one embodiment the contextual database(s) 311 are extensible to accommodate third-party applications (e.g., databases for storing and aggregating additional data) via a set of open APIs. For example, at run time the contextual database(s) 311 may scan its current directory looking for third-party databases which have appropriate APIs activated. These APIs, which are callable by the contextual database(s) 311, allow programmers to add specific Who, What, and Where information to the web from within their application. This information may then be aggregated along with other information from the contextual database(s) 311 and passed to the browser (not shown) for transport to the web server 235.

According to one embodiment, end-user information may include personally identifying data (such as, but not limited to first and/or last name, address information (e.g., a street address of a residence of the end user, a city in which the residence is located, a state in which the residence is located, a ZIP Code in which the residence is located, a country in which the residence is located), one or more phone numbers (e.g., a home phone number, a cell phone number, such as a phone number associated with a Subscriber Identity Module (SIM) card of the client device, or a work phone number), one or more email addresses, social security number (SSN), national ID number, employee number and credit card account information), personal interest data (such as, but not limited to, food, music, leisure, technology, entertainment preferences, personal advertising preferences, social advertising preferences), demographic data (such as, but not limited to age, gender, income, spending, employment, profession, household income, education level, number of children, number of people in the household, marital status, sexual orientation, political affiliation, ethnicity, group memberships, etc.), a language in which the end user would prefer information to be presented, passwords, loyalty program account information, etc.

In one embodiment device and terminal capabilities include, but are not limited to, screen resolution, color capabilities, accepted compression, audio and video formats, etc.

According to various embodiments of the present invention, operating system capabilities include, but are not limited to, the operating system's ability to provide information regarding the client device battery level, battery status, battery temperature, battery voltage, device ID, device name, idle time, operating system version, platform version, user interface mode (e.g., beginner, intermediate, advanced), whether the battery is removable, whether the device is "holstered" or tethered to a PC, whether the device is a simulator, the current font being used by the user interface and/or the fonts available.

In one embodiment, contextual data may be periodically polled (pulled) from various internal and/or external sources, such as third party or user entered context source(s) 350, global positioning system (GPS) receiver 360 and external content source(s) 370, and aggregated and stored within contextual database(s) 311.

In one embodiment, the context reporting API 315 may be called by context sources when new information is available. Alternatively, outwardly facing calls may be made by the client context manager 310. For example, the context sources may implement standardized routines that may be called by client context manager 310 whenever client context manager 310 desires to have up-to-date context data (e.g., prior to sending an HTTP request responsive to a navigation request by the end user or other client applications 340) from such context sources.

Similarly, other client applications 340 installed on the mobile device 300 may call an appropriate routine within the context transmission API 316 when they have context data they would like to transmit to a web server as part of a navigation request. Or, the other client applications 340 may implement standardized routines (as described further below) that may be subject to outward facing calls by client context manager 310 prior to sending an HTTP request on behalf of such applications.

In one embodiment, compression/decompression controller 312 contains the current compression and decompression libraries. According to various embodiments, the compression and decompression libraries may be augmented by third parties. Depending on whether or not compression/decompression is required these library routines are called by the browser helper object, for example.

Similarly, the encryption/decryption controller 314 contains the current encryption and decryption libraries, which may also be augmented by third parties. Depending on whether or not encryption/decryption is required these library routines are called by the browser helper object, for example.

According to various embodiments, menu overlay controller 313 is configured with hooks into the operating system 330 and/or the browser 320 as appropriate to respond to menu interactions by the end user. In one embodiment, and as described further below, menu overlay controller 313 extracts contextual menu information, such as contextual menu information 243 inserted into an augmented HTML file (e.g., augmented HTML file 225), from web content received by the mobile device 300 and uses this extracted contextual menu information to supplement the current menu structure of the browser 320 or the operating system 330 by creating overlay windows. For example, menu overlay controller 313 may be called responsive to browser helper object 321 intercepting an augmented HTML file containing contextual menu information. Then, menu overlay controller 313 may parse out the contextual menu information and insert appropriate contextual menu entries into the browser menu structure via a windows overlay call. In one embodiment, the contextual menu entries are presented by obtaining the menu handle of the current window and updating it with the new data.

Essentially, in various embodiments of the present invention, the client context manager 310 may intercept calls when the browser menu key is pressed and then menu overlay controller 313 may add other contextual menu entries on top of or adjacent to the current standard menu. In alternative embodiments, assuming the availability of an open API within the operating system 330 or the browser 320 relating to menu customization, appropriate calls can be made to such API or call back routines registered with such API.

While in the environment of the present example, contextual database(s) 311, compression/decompression controller 312, menu overlay controller 313 and encryption/decryption controller 314 have been described as residing within or as part of the client context manager 310, in alternative embodiments one or more of these functional units may be implemented within operating system 330, browser 320 or by hardware or firmware (not shown) associated with the mobile device 300.

In one embodiment, the functionality of one or more of the above-referenced functional units may be merged in various combinations. For example, compression/decompression controller 312 may be incorporated within the encryption/decryption controller 314 or vice versa. Moreover, the various functional units can be communicatively coupled using any suitable communication method (e.g., message passing, parameter passing, and/or signals through one or more communication paths, etc.). Additionally, the functional units can be physically connected according to any suitable interconnection architecture (e.g., fully connected, hypercube, etc.).

According to embodiments of the invention, the functional units can be any suitable type of logic (e.g., digital logic, software code and the like) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

Figure 4:
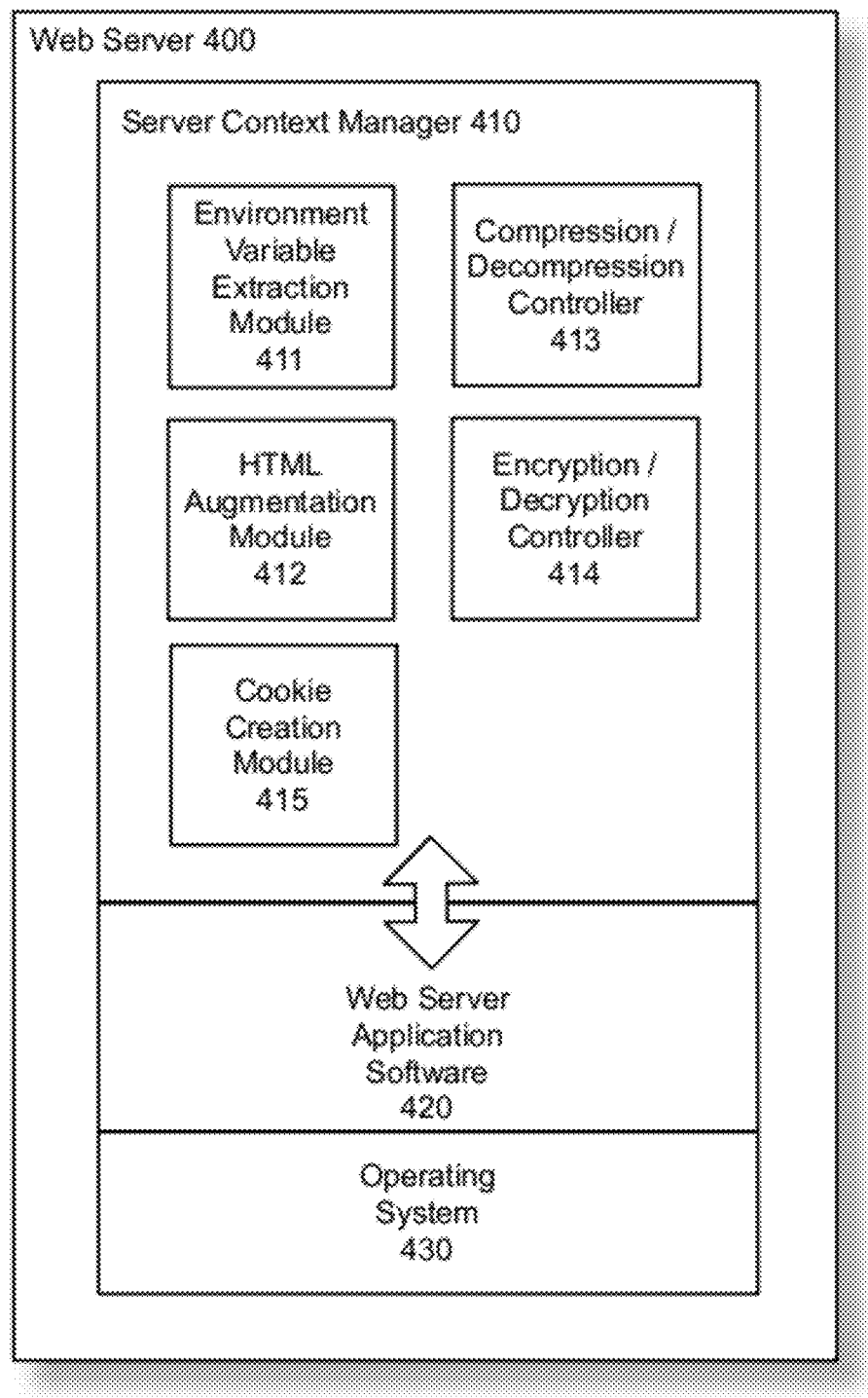
FIG. 4 is a simplified block diagram conceptually illustrating the interactions of various functional units of a web server in accordance with an embodiment of the present invention.

FIG. 4 is a simplified block diagram conceptually illustrating the interactions of various functional units of a web server 400 in accordance with an embodiment of the present invention. In the present example, web server 400 includes a server context manager 410, web server application software 420 and an operating system 430. In one embodiment of the present invention, the server context manager 410 may be implemented as a web server-side plug-in. For example, server context manager 410 may comprise an Internet Server Application Programming Interface (ISAPI) filter. ISAPI filters are DLL files that can be used to modify and enhance the functionality provided by Internet Information Services (IIS), Microsoft's collection of Windows-based web server services. In one embodiment, the server context manager 410 runs on an IIS server, filtering every request flowing through web server 400 until it observers one that it is configured to process.

In general, server context manager 410, may listen to all requests to the site or sites on which it is installed. The ability to examine and modify both incoming and outgoing streams of data makes ISAPI filters powerful and flexible. In embodiments in which server context manager 410 is implemented as an ISAPI filter, it may be registered at either the site level or the global level (global filters apply to all sites on the IIS server), and are initialized when the worker process is started.

As depicted and in accordance with the present example, server context manager 410 includes an environment variable extraction module 411, an HTML augmentation module 412, a compression/decompression controller 413, an encryption/decryption controller 414 and a cookie creation module 415.

In one embodiment, compression/decompression controller 413 contains the current compression and decompression libraries which can be augmented by third parties. Depending on whether or not compression/decompression is required these library routines may be called.

Similarly, encryption/decryption controller 414 contains the current encryption and decryption libraries which can be augmented by third parties. Depending on whether or not encryption/decryption is required these library routines may be called.

According to various embodiments of the present invention, contextual data provided by a requesting client device is distributed to information servers (e.g., application servers and/or database servers) fronted by web server 400 in the form of environment variables. In one embodiment, incoming request data from requesting client devices is in the form of HTTP requests, which may include unsolicited cookies inside the standard header, such as unsolicited cookie 222. Consistent with RFC 2109, according to one embodiment, when a requesting client device sends an HTTP request to a web server, such as web server 400, and the requesting client device has contextual data that is applicable to the interactions at issue, the cookie creation module 415, for example, may use the standard cookie request header within the HTTP request to send an unsolicited cookie to the web server.

An example of an unsolicited cookie is as follows (depending upon the particular implementation/application, more or less information may be conveyed):

```
HTTP_COOKIE="os_build_model=SAMSUNG-SGH-I897;
email_address=cranstone@5o9inc.com; name=Peter
Cranstone; zipcode=80108;
cell_phone_number=123456789; gps_time=07/26/2011
03:22:04 PM MDT; gps_lat=39.4236266966692665;
gps_long=-104.8899048178727; gps_alt=1829.0;
gps_speed=0.0; gps_direction=0.0;"
```

According to one embodiment (and based on the above exemplary unsolicited cookie), a cookie name/value pairs extraction module (not shown) is configured to extract the following cookie values from incoming request data (depending upon the particular implementation/application, more or fewer cookie name/value pairs may be used):

```
$device        = $_COOKIE{'os_build_model'};
$name          = $_COOKIE{'name'};
$email         = $_COOKIE{'email_address'};
$phone         = $_COOKIE{'cell_phone_number'};
$zipcode       = $_COOKIE{'zipcode'};
$gpstime       = $_COOKIE{'gps_time'};
$gpslat        = $_COOKIE('gps_lat'};
$gpslong       = $_COOKIE{'gps_long'};
$gpsspeed      = $_COOKIE{'gps_speed'};
$gpsdirection  = $_COOKIE{'gps_direction'};
```

Once the cookie values have been retrieved and stored in variables, the contextual data may be passed back to the appropriate information server, e.g., one of application servers 250 or database server 260, via the common gateway interface (CGI) protocol. Based on the disclosure provided herein, one of ordinary skill in the art will appreciate a variety of ways in which contextual data may be passed to the appropriate information server.

According to one embodiment (and based on the above exemplary unsolicited cookie), a Mod_Mobile module may decrypt the inbound cookie data and append it to the "_ENV" environment variable array before PHP processing. For example, environment variable extraction module 411 may be configured to extract the following environment variables from the environment variable array:

```
$device   = $_ENV{'os_build_model'};
$name     = $_ENV{'name'};
```

```
$email       = $_ENV{'email_address'};
$phone       = $_ENV{'cell_phone_number'};
$zipcode     = $_ENV{'zipcode'};
$gpstime     = $_ENV{'gps_time'};
$gpslat      = $_ENV{'gps_lat'};
$gpslong     = $_ENV{'gps_long'};
$gpsspeed    = $_ENV{'gps_speed'};
$gpsdirection = $_ENV{'gps_direction'};
```

Once the environment variables have been set, the contextual data may be passed back to the appropriate information server, e.g., one of application servers 250 or database server 260, via the common gateway interface (CGI) protocol.

In one embodiment of the present invention, HTML augmentation module 412 incorporates customized content, such as customized content 242, received from information servers, e.g., one of application servers 250 and/or database server 260, responsive to the client request into one or more augmented HTML files. HTML augmentation module 412 may also format the content returned to the requesting client device in accordance with various device and/or terminal characteristics, settings and/or parameters as indicated within the client request.

In one embodiment of the present invention, cookie creation module 415 creates cookies responsive to unsolicited cookies received from client devices. For example, cookie creation module 415 may extract the "stateful" information contained within an unsolicited cookie to issue a "Set Cookie" (e.g., cookie(s) 224) back to the requesting User Agent. Once that Cookie is stored in the Browser then any JavaScript contained within the page response can access that meta data.

In one embodiment, an unsolicited cookie may be used to convey tracking preference information, such as that specified by the DNT Working Draft. The following example unsolicited cookies are intended to illustrate various, non-limiting usage scenarios. Depending upon the particular implementation, the following examples may apply to a target site, a list of websites or may apply globally to all websites.

Example #1

HTTP_COOKIE="DNT:1; exception approved"

In Example #1, the user has expressed a preference not to be tracked on the target site, but has subsequently approved an exception for the target site.

Example #2

HTTP_COOKIE="DNT:1; Type:location data; Period:1 hour"

In Example #2, the user has expressed a preference not to be tracked on the target site, but has subsequently approved an exception to the target site to allow a certain type of data to be shared (i.e., location data) for a limited time period (i.e., 1 hour).

Example #3

HTTP_COOKIE="DNT:0; Frequency:3"

In Example #3, the user has expressed a preference to allow tracking on the target site, but has also provided information regarding frequency capping for ads. The frequency value of '3' may be interpreted as limiting the display of a particular ad to the end user to 3 times within a 24-hour period.

Example #4

HTTP_COOKIE="DNT:0; Excluded_Ads:Tobacco, Alcohol"

In Example #4, the user has expressed a preference to allow tracking on the target site, but has also provided information regarding prohibited types of ads (e.g., those relating to tobacco and/or alcohol).

Example #5

HTTP_COOKIE="DNT:0; Interests:Travel, Movies"

In Example #5, the user has expressed a preference to allow tracking on the target site, and has also provided information regarding interests (e.g., travel and movies), which may be used in connection with targeted ads.

Figure 5:
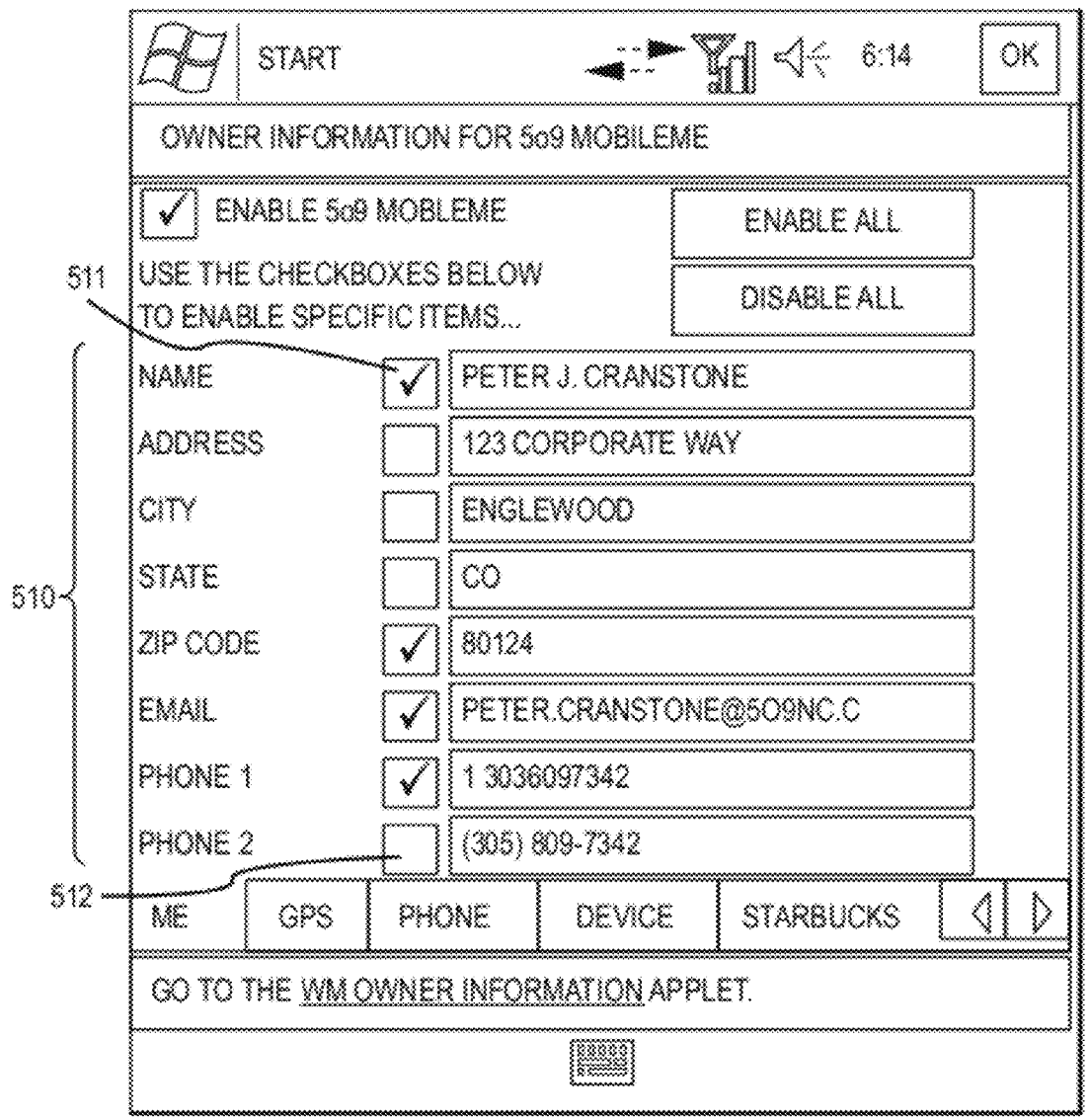
FIG. 5 illustrates an owner information screen, which allows an end user to selectively enable or disable transmission of various fields of personal information in accordance with an embodiment of the present invention.

FIG. 5 illustrates an owner information screen in accordance with an embodiment of the present invention. In the current example, checkboxes are provided to allow an end user to selectively enable or disable transmission of various protected fields of contextual data, such as personal information 510. If a checkbox is checked, such as checkbox 511, the information associated with the corresponding protected field is sent with navigation requests originated by the mobile device. If a checkbox is unchecked, such as checkbox 512, the information associated with the corresponding protected field is not transmitted with navigation requests. In one embodiment, different subsets of protected fields may be enabled or disabled on a domain-by-domain basis, on a site classification basis and the like. End user preferences regarding enabled/disabled protected fields may also be applied in relation to context not associated with the target of the navigation. For example, protected fields may be independently enabled or disabled based on the day of the week, times of day, etc. In this manner, an end user may be provided with full control of the type of information made available to web servers and/or service providers.

Figure 6:
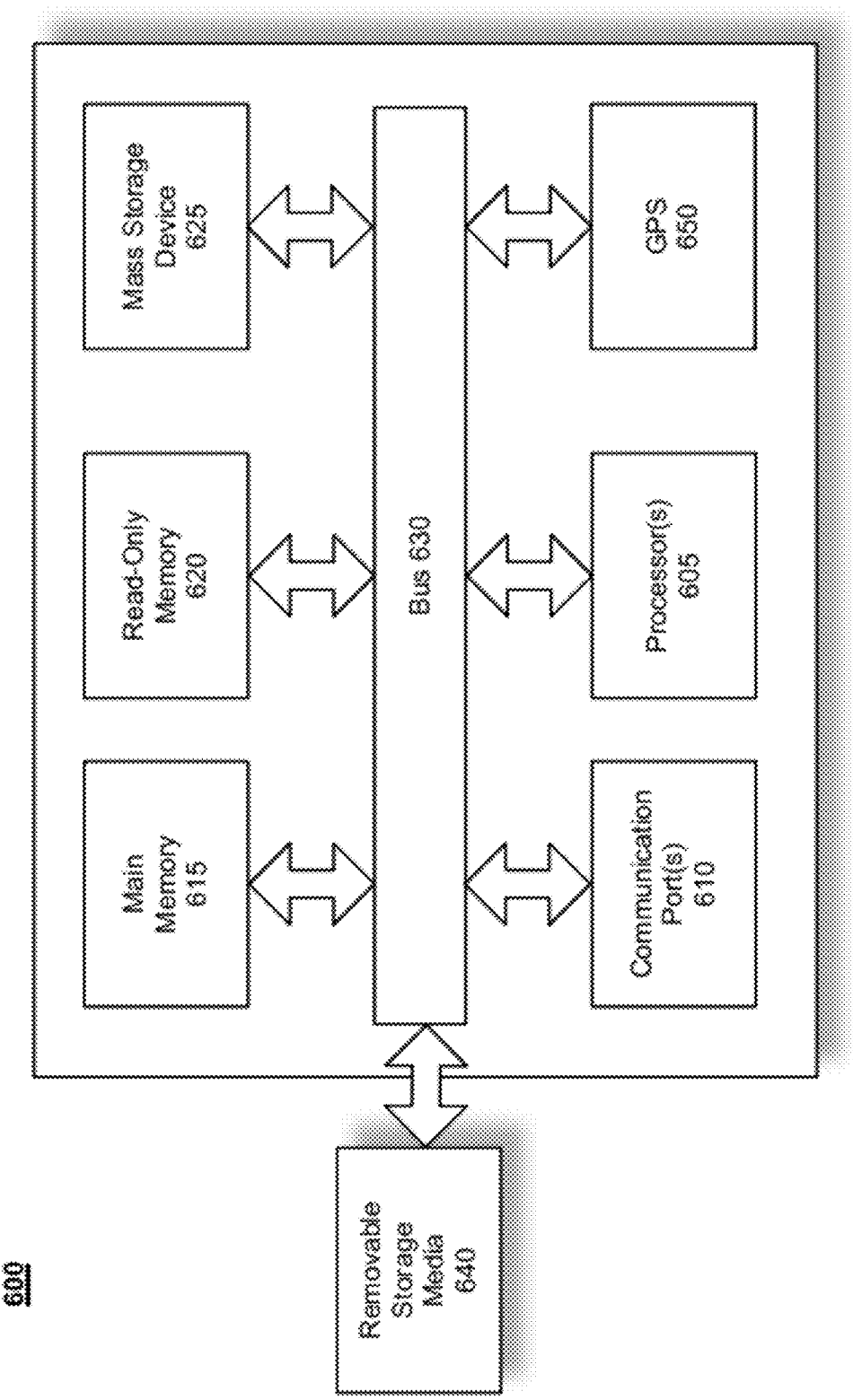
FIG. 6 is an example of a computer system with which embodiments of the present invention may be utilized.

Embodiments of the present invention include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600, such as a client device or web server, with which embodiments of the present invention may be utilized.

According to the present example, the computer system includes a bus 630, at least one processor 605, at least one communication port 610, a main memory 615, a removable storage media 640 a read only memory 620, and a mass storage 625.

Processor(s) 605 can be any known processor, such as, but not limited to, mobile application processors or other processors designed for portable devices, such as the ARM Cortex™-A7, -A8 or A9 processor of ARM Holdings, one or more of Texas Instruments' OMAP family of processors (e.g., the OMAP2430 or the OMAPV2230), an Intel® 80386 processor, and Intel PXA901 processor, an Intel Itanium® or Itanium 2 processor(s), or AMDC®, Opteron® or Athlon MP® processor(s), or Motorola® lines of processors. Notably, future mobile devices are likely to have at least two processors, one for carrier processing and one for application processing or one for personal use and one for business use.

Among other things, processor(s) 605 is generally responsible for executing various operational instructions maintained in main memory 515, and processing and otherwise interacting with various other input/output (I/O) devices, such as internal and/or external context data sources. In one embodiment of the present invention, processor(s) 605 may receive interrupts on a periodic basis from context data sources (e.g., external context source(s) 370, GPS receiver 360 and/or third-party context source(s) 350). Such interrupts may be received, for example, whenever new data is available from the particular source or on a periodic basis (e.g., every few seconds or so). Such interrupts may be received using any interrupt scheme known in the art including, but not limited to, using a polling scheme where processor(s) 605 periodically reviews an interrupt register, or using an asynchronous interrupt port of processor 605. Alternatively or additionally, the processor(s) 605 may proactively request data from context data sources on a periodic or as needed basis. Based on the disclosure provided herein, one of ordinary skill in the art will recognize a variety of interrupt and/or polling mechanisms that may be used in relation to different embodiments of the present invention.

Communication port(s) 610 represent physical and/or logical ports. For example communication port(s) may be any of an RS-232 port for use with a modem based dialup connection, a 10/100 Ethernet port, or a Gigabit port using copper or fiber. Communication port(s) 610 may be chosen depending on a network such a Local Area Network (LAN), Wide Area Network (WAN), or any network to which the computer system 600 connects.

Communication port(s) 610 may also be the name of the end of a logical connection (e.g., a Transmission Control Protocol (TCP) and/or User Datagram Protocol (UDP) port). For example communication ports may be one of the Well Know Ports, such as TCP port 80 (used for HTTP service), assigned by the Internet Assigned Numbers Authority (IANA) for specific uses.

Main memory 615 can be Random Access Memory (RAM), or any other dynamic storage device(s) commonly known in the art. Read only memory 620 can be any static storage device(s) such as Programmable Read Only Memory (PROM) chips for storing static information such as instructions for processor 605.

Mass storage 625 can be used to store information and instructions. For example, hard disks such as the Adaptec® family of SCSI drives, an optical disc, an array of disks such as RAID, such as the Adaptec family of RAID drives, or any other mass storage devices may be used.

Bus 630 communicatively couples processor(s) 605 with the other memory, storage and communication blocks. Bus 630 can be a PCI/PCI-X or SCSI based system bus depending on the storage devices used.

Optionally, in the case of a server and typically in the case of a fixed client device, such as a desktop computer, operator and administrative interfaces 635, such as a display, keyboard, and a cursor control device, may also be coupled to bus 630 to support direct operator interaction with computer system 600. Other operator and administrative interfaces can be provided through network connections connected through communication ports 610.

Removable storage media 640 can be any kind of external hard-drives, floppy drives, IOMEGA® Zip Drives, Compact Disc—Read Only Memory (CD-ROM), MultiMedia Cards (MMCs), secure digital (SD) cards, such as miniSD and microSD cards, Compact Disc—Re-Writable (CD-RW), Digital Video Disk—Read Only Memory (DVD-ROM).

GPS 650 includes a GPS receiver and provides real-time GPS location data. GPS 650 may be an external or integrated with the client device. GPS 650 may include its own processor and/or memory or utilize the host processor(s).

Depending upon the particular implementation, computer system 600 may also include one or more other integrated or externally connected devices that serve as sources for context data. For example, other sources of context data include, but are not limited to, blue tooth devices, USB devices, flash drives, fingerprint readers or other biometric devices, heart rate monitors, environmental sensors and the like.

The components described above are meant to exemplify some types of possibilities. In no way should the aforementioned examples limit the scope of the invention, as they are only exemplary embodiments.

Figure 7:
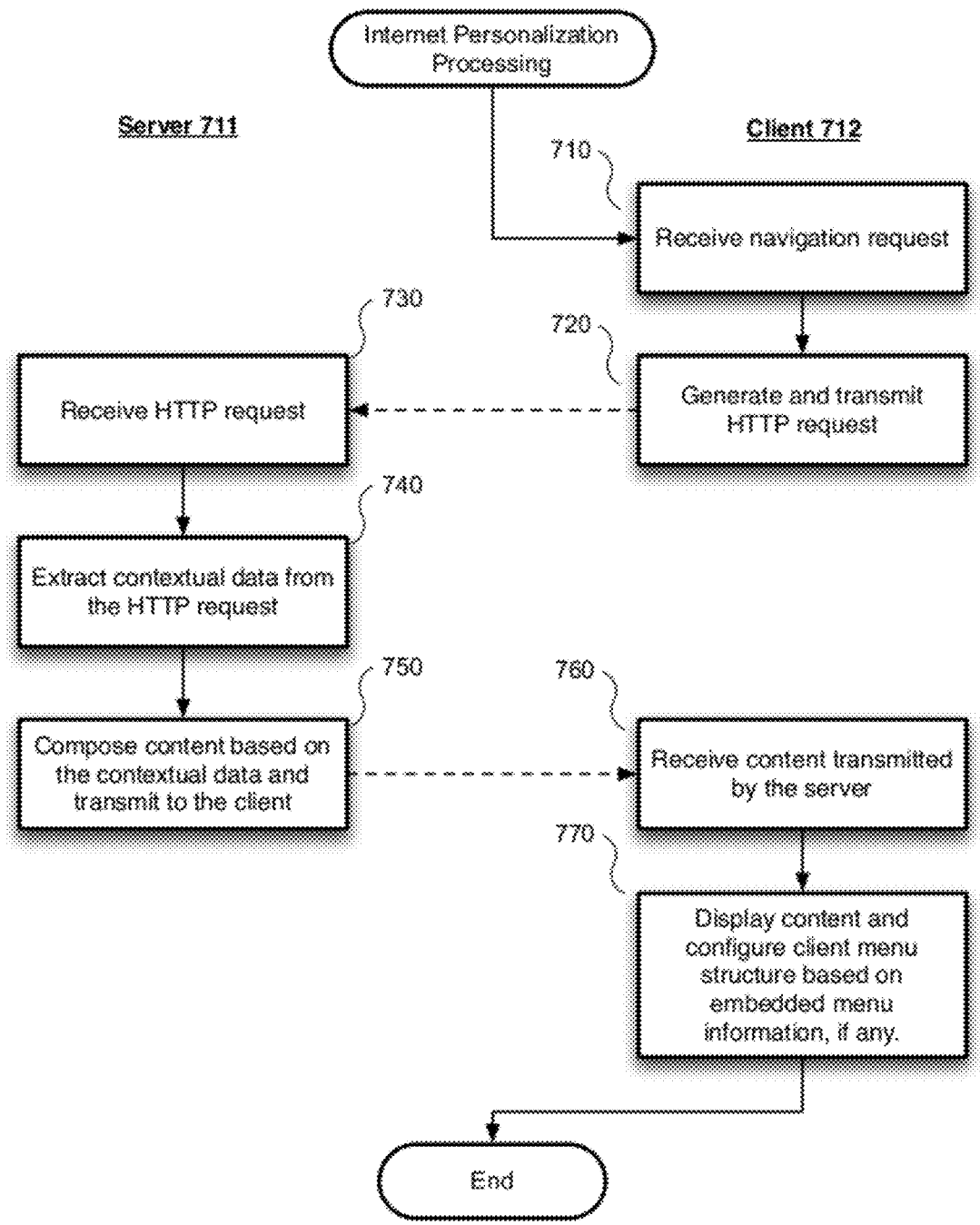
FIG. 7 is a high-level flow diagram illustrating Internet personalization processing in accordance with an embodiment of the present invention.

FIG. 7 is a high-level flow diagram illustrating Internet personalization processing in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 710, a navigation request is received at client 712. The navigation request may be as a result of end user interaction with a user agent (e.g., a browser or other web-enabled application). Alternatively, the navigation request may be generated without end user involvement, such as for example, in the case of automated updates to software and the like.

At block 720, responsive to the navigation request, the client 712 generates and transmits an HTTP request (e.g., an augmented HTTP request) including contextual data. According to one embodiment, the HTTP request is a standard or conventional HTTP request, but is supplemented to include additional information relating to one or more of location information, device data, terminal capabilities, operating system capabilities, user data and time information. According to one embodiment, the HTTP request includes one or more customized HTTP X-headers (not shown) and/or an unsolicited cookie for transmitting contextual data to a server 711. The contextual data may include, but is not limited to: (i) information regarding who the user is (e.g., names, addresses, phone numbers, gender, personal advertising preferences (e.g., frequency capping and/or time capping), data sharing preferences, tracking preferences (e.g., relating to how data about the end user will be collected (data collection) and/or how it will be used (targeted advertising), social networking preferences); (iii) what the client device is, what the operating system and/or terminal capabilities are (e.g., screen resolution, color capabilities, graphics capabilities, accepted compression, etc.); and (iii) information indicating where the client device is, such as real-time GPS location of the client device from which the request originated.

At block 730, server 711 receives the HTTP request. In one embodiment, the HTTP request is first seen by a web server-side plug-in, such as an Internet Server Application Programming Interface (ISAPI) filter. Based on the disclosure provided herein, one of ordinary skill in the art will appreciate a variety of alternative mechanisms by which the HTTP request may be processed.

At block 740, the server 711 extracts contextual data provided by client 712 from the HTTP request. As indicated above, in one embodiment, the contextual data is transmitted in one or more customized HTTP X-header fields or within an unsolicited cookie embedded within the HTTP request.

At block 750, based on the contextual data, content is composed and transmitted to client 712. In one embodiment, the first party returns content (e.g., customized/tailored first party content and/or customized/tailored third-party content (e.g., a targeted ad) composed in accordance with current privacy and/or advertising personalization settings (e.g., tracking and/or data sharing preferences) established by the end user. Alternatively or additionally, an information server, such as one of application servers 250 or database server 260, fronted by server 711 may customize the content and/or format of the content requested by client 712.

According to one embodiment, the server 711, responsive to receipt of an unsolicited cookie (e.g., unsolicited cookie 222), uses the "stateful" information contained therein to "Set Cookie" (e.g., cookie(s) 224) back to the requesting User Agent as part of an HTTP response. As noted above, once that Cookie is stored in the Browser then any JavaScript contained within the page response can access that meta data.

In some embodiments, the server 711 may request an exception to the data sharing preferences and/or tracking preferences expressed by the client 712. When such an exception is granted, information regarding the site(s) for which the exception applies and/or other information regarding the scope of the exception may be stored in a database local to the client 712, such as contextual database 311. In this manner, during subsequent interactions with a website for which an exception has been granted, the client 712 may retrieve applicable data sharing preferences and/or tracking preferences and associated exceptions for communication to the website.

According to one embodiment, server 711 generates and transmits an HTML file (e.g., an augmented HTML file) to client 712 with the HTTP response. According to one embodiment the HTML file transmitted to client 712 represents a standard or conventional HTML file, but may be supplemented to include additional information regarding a menu structure to be presented on the client 712. According to one embodiment, custom menu information may be embedded within a comment of a script of the augmented HTML file. In another embodiment, the custom menu information may be embedded within a meta tag defined for this purpose and recognized by the client-side functionality. Based on the disclosure provided herein, one of ordinary skill in the art will appreciate a variety of ways in which custom menu information may be embedded within an augmented HTML file.

In some embodiments, optional custom menu information may take into consideration all or part of the contextual data provided by the requesting client device 712. For example, in one embodiment, the context data may indicate the end user is a novice user. Responsive to this indication of the user's skill level, the menu structure provided by the server 711 may exclude advanced features. Similarly, an indication within the context data provided by the client 712 that the user is an expert user of the web service or application being accessed on the server 711 may cause the server 711 to provide the client 712 with a menu structure that includes the advanced features.

At block 760, content transmitted by the serer 711 (e.g., the HTTP response and associated HTML file) is received by client 712. In one embodiment, the HTML file is first seen by a browser helper object, such as browser helper object 321.

At block 770, the content returned by the server 711 is rendered on a display of the client 712. Additionally, if embedded menu information is contained within the HTML file, a menu structure of client 712 is updated accordingly as illustrated and described with reference to FIGS. 8A and 8B. According to one embodiment, the information regarding the menu structure, if any, received in the HTTP response and/or the returned HTML file is used to dynamically reconfigure the menu information/structure presented by the operating system and/or a user agent (e.g., a mobile browser) running on the client device 712. In one embodiment, the browser helper object, responsive to intercepting an augmented HTML file, invokes a menu overlay controller 313, which creates overlay windows via appropriate windows overlay calls by obtaining the menu handle of the desired window, e.g., the browser window menu handle, and updating it. On an ongoing basis, the overlay controller 313 may then intercept calls when the browser menu key is pressed and may add other contextual menu entries on top of the current standard menu.

Use Cases/Examples

As indicated above, as a result of the device-, user- and location-awareness provided to content and service providers by embodiments of the present invention, numerous data usage models, such as local search, local advertising, location-based services, mobile asset and policy management, mobile content, personalized content and the like, become feasible. For purposes of illustrating the versatility of various embodiments of the contextual data communication platform, the following additional use cases and examples will now be described; however, these specific examples are in no way intended to be limiting on the present invention as various alternatives, modifications, and equivalents will be apparent to those skilled in the art without varying from the spirit of the invention.

Use Case #1—Targeted Advertising. Many of today's Internet services are free, based upon delivering targeted advertising to site visitors. As such, the ability to pass along context cookies or other electronic packages of who, what and where "Me" data is critical to data collection and aggregation companies, behavioral targeting organizations and advertisers whose business model is to deliver ads that are optimized for the user, their device and/or their location. Additionally, the need to include privacy preferences or ask permission to use or share who, what and where data is becoming increasingly important to may consumers and may be regulated by some governmental organizations. In various embodiments of the present invention, Me data may be used to both facilitate targeted advertising and to effectively manage and/or audit privacy preferences by a website or between multiple sites looking to collect and re-use or resell this data. For example, the data may be used to target ads, to restrict or limit the targeting of ads, including the ability or not to sell the data for profit, or to audit privacy preference management.

Use Case #2—Ad-based Content and Behavioral Marketing. In embodiments of the present invention, advertising content may be tailored for the user based upon available information about the user. The "tailoring" data (user profile or digital ad) may be maintained by one or more third parties, but the tailored response originates from the Web server. For example, the Web server may use a privacy setting contained within a content request received from a browser to select or request generic content or ads or redirects a cookie, user ID or IP address to a third-party to access targeted ads. The Web server composes, or tailors the final page, on-the-fly, for the specific request, in response to the privacy preference setting.

Use Case #3—Privacy Settings. Privacy settings may be used to define data sharing or tracking use relative to purpose (e.g., behavioral targeting, advertising, promotional offers and coupons, performance optimization, aggregated statistical analysis) or context. User-defined exceptions—or a plurality of user privacy settings may be used to provide desired granularity. For example, default settings in relation to receipt of unsolicited coupons may be overridden when the user is shopping (context-based exception) or within a configurable range (geography-based exception) of the product/service offered. Similarly, different settings may be active based on the day of the week and/or the time of day (e.g., use "work" settings from 8-5 on week days and "personal" settings at all other times).

In some embodiments, privacy settings may be based upon session use only by the owner of the URL visited. For example, unsolicited cookies/X-Headers may enable personalization without tracking by allowing the first party to use the data to programmatically personalize content, but not allowing the first party to add the context data to the owner's profile. According to one embodiment, the user agent may electronically "negotiate" with the site owner to a mutually agreeable privacy policy.

In some embodiments, privacy settings may be provided that specify a user's data sharing preference relative to which Ad network(s) or behavioral targeting organization(s) "Me" data may be shared.

Privacy settings may also be provided that specify to the web server how long the "Me" data may be stored for behavioral targeting purposes (e.g., 1 week, 1 month, 1 year). This is a user-defined expiration date on their personal information and would not interfere with legal requirements to store transactional data. In one embodiment, "Me" data may be encrypted and may retain its encryption during a redirect from a first party, so that only the first party can see it. In this manner, only approved parties get the key to unlock the "Me" data.

According to one embodiment, privacy settings may be tied to the monetization of data use. For example, the privacy settings may limit how many partners with whom the first party can share "Me" data. The settings may identify where any monies or credits for data sharing are to be deposited (e.g., PayPal account). The settings may also identify alternative servers to whom data may be sent (e.g., Nielsen). In this manner, the client dictates the sharing, not the server. The settings may express a "privacy level" (e.g., good privacy, better privacy, best privacy) as opposed to a binary data sharing preference (e.g., 0=data sharing not permitted/1=data sharing is permitted). In one embodiment, the privacy level may be negotiated and/or defined against a privacy/reward scale that pays or otherwise compensates the end user for sharing his/her personal data.

Use Case #4—Ad Auctioning/Bidding. In one embodiment, advertisers may offer more or less for an advertising opportunity based upon the volume and or type of context included in an Unsolicited Cookie or X-Headers. Cookie data may be used to programmatically optimize performance, content type and/or delivery based upon device, location and/or network data. This may affect not only content delivery sites, but rich media advertising and the how payment for that advertising is processed. For example, an advertiser would rather not pay for a video delivered to mobile device that can't properly display it to an end user. In one embodiment, the mobile device may automatically generate a cookie based upon its ability to properly display rich media advertising. Alternatively, the cookie data may be mapped to the ad delivery/click-thru data to verify its validity (similar to an ad delivery/interaction receipt). In this manner advertisers and/or ad networks may be provided with an audit trail to make sure they are not charged/don't charge for a click through that fails, for example, because the device can't read flash, view a video or a PDF white paper.

Use Case #5—Social and/or Peer-to-Peer Networks. According to one embodiment, sharing of "Me" data or user preferences with Social networks, such as Facebook, Google+, Twitter, Linked-In or Private Social Networks may be limited to circumstances expressly defined by the end user or negotiated with the service provider.

Other Examples

Specific Who, What & Where data may be used to audit regulatory compliance of Do Not Track or other privacy standards, regulations and laws. Specific who, what and where data may be used to authenticate identity in m-commerce, healthcare, government services or other high-security or high-privacy transactions and trigger any number of identity challenges, such as PIN entry, voice recognition, fingerprint scanning and location relative to the merchant.

Embodiments of the present invention provide novel systems, methods and devices for a contextual data platform. While detailed descriptions of one or more embodiments of the invention have been given above, various alternatives, modifications, and equivalents will be apparent to those skilled in the art without varying from the spirit of the invention.

What is claimed is:

1. An Internet-enabled mobile device comprising:
a non-transitory storage device having tangibly embodied thereon instructions associated with a context management routine; and
one or more processors coupled to the non-transitory storage device and operable to execute the instructions associated with the context management routine to perform a method comprising:
transmitting to a server device a HyperText Transport Protocol (HTTP) request relating to a service supported by the server device, wherein the HTTP request contains therein an unsolicited cookie including data indicative of one or more of (a) information regarding an end user of the Internet-enabled mobile device, (b) information regarding the Internet-enabled mobile device, (c) information regarding a location of the Internet-enabled mobile device and (d) information regarding a network to which the Internet-enabled mobile device is connected;

responsive to the HTTP request, receiving from the server device a HyperText Markup Language (HTML) file within which contextual menu information based on the service and the unsolicited cookie is embedded;

extracting the contextual menu information from the HTML file; and customizing end user interaction with the service by dynamically reconfiguring a browser menu of the Internet-enabled mobile device based on the contextual menu information.

2. The Internet-enabled mobile device of claim 1, wherein the information regarding an end user of the Internet-enabled mobile device includes selectively enabled personal information configurable via an owner information screen.

3. The Internet-enabled mobile device of claim 1, wherein the information regarding the Internet-enabled mobile device includes characteristics, settings or parameters of an operating system installed on the Internet-enabled mobile device.

4. The Internet-enabled mobile device of claim 1, wherein the information regarding a location of the Internet-enabled mobile device includes a geographic location reported by a Global Positioning System (GPS) receiver associated with the Internet-enabled mobile device.

5. The Internet-enabled mobile device of claim 1, wherein the information regarding a location of the Internet-enabled mobile device includes a geographic location associated with a wireless access point, a network or a cell tower with which the Internet-enabled mobile device is connected.

6. The Internet-enabled mobile device of claim 1, wherein the reconfigured browser menu promotes ease-of-use of the service by the end user by at least in part shifting navigation away from one or more web pages associated with the service and into the browser menu.

7. A server device comprising:

a non-transitory storage device having tangibly embodied thereon instructions associated with a context management routine; and one or more processors coupled to the non-transitory storage device and operable to execute the instructions associated with the context management routine to perform a method comprising:

receiving from an Internet-enabled mobile device a HyperText Transport Protocol (HTTP) request relating to a service supported by the server device, wherein the HTTP request contains therein an unsolicited cookie including data indicative of one or more of (a) information regarding an end user of the Internet-enabled mobile device, (b) information regarding the Internet-enabled mobile device, (c) information regarding a location of the Internet-enabled mobile device and (d) information regarding a network to which the Internet-enabled mobile device is connected;

generating contextual menu information based at least in part on the unsolicited cookie; and causing the Internet-enabled mobile device to dynamically reconfigure a browser menu of the Internet-enabled mobile device by returning to the Internet-enabled mobile device, responsive to the HTTP request, a HyperText Markup Language (HTML) file having embedded therein the contextual menu information.

8. The server device of claim 7, wherein the information regarding an end user of the Internet-enabled mobile device includes selectively enabled personal information configurable via an owner information screen of the Internet-enabled mobile device.

9. The server device of claim 7, wherein the information regarding the Internet-enabled mobile device includes characteristics, settings or parameters of an operating system installed on the Internet-enabled mobile device.

10. The server device of claim 7, wherein the information regarding a location of the Internet-enabled mobile device includes a geographic location reported by a Global Positioning System (GPS) receiver associated with the Internet-enabled mobile device.

11. The server device of claim 7, wherein the information regarding a location of the Internet-enabled mobile device includes a geographic location associated with a wireless access point, a network or a cell tower with which the Internet-enabled mobile device is connected.

12. The server device of claim 7, wherein the reconfigured browser menu promotes ease-of-use of the service by the end user by at least in part shifting navigation away from one or more web pages associated with the service and into the browser menu.

13. A computer-implemented method comprising:

causing to be stored, by a user agent running on an Internet-enabled device, information indicative of a current privacy setting;

receiving, by the user agent, a navigation request relating to a resource associated with a web server;

responsive to the navigation request, causing a HyperText Transport Protocol (HTTP) request to be generated, wherein a value associated with an HTTP header field of the HTTP request is set based on the current privacy setting; and requesting the web server to return to the user agent content associated with the resource by transmitting the HTTP request to the web server.

14. The method of claim 13, wherein the content is composed by the web server based at least in part on the value associated with the HTTP header field.

15. The method of claim 14, wherein the one or more HTTP header fields comprise an unsolicited cookie.

16. The method of claim 15, wherein the unsolicited cookie contains information regarding a tracking preference or a data sharing preference of an end user of the Internet-enabled device.

17. The method of claim 15, wherein the unsolicited cookie contains information regarding the end user's expressed preference concerning targeted advertising.

18. The method of claim 15, wherein the unsolicited cookie contains information regarding frequency capping.

19. The method of claim 15, wherein the unsolicited cookie contains information regarding the end user's expressed preference concerning data collection and use.

20. The method of claim 15, further comprising setting one or more values associated with one or more HTTP header fields of the HTTP request based at least upon one or more of (a) exception information relating to one or more exceptions to the current privacy setting and (b) auditing information.

21. The method of claim 20, wherein said causing a HyperText Transport Protocol (HTTP) request to be generated includes retrieving information regarding the current privacy setting and the exception information from a database maintained on the Internet-enabled device.

22. The method of claim 21, wherein the exception information comprises a list of a plurality of web sites for which an end user of the user agent has consented to an exception to the current privacy setting.

23. The method of claim 21, wherein the exception information comprises one or more of (a) a site-specific exception to the current privacy setting to which an end user of the user agent has consented, (b) a time-specific exception to the current privacy setting, (c) a purpose-specific exception to the current privacy setting, (d) a context-specific exception to the current privacy setting and (e) a geography-based exception to the current privacy setting.

24. The method of claim 15, further comprising
retrieving extension information from a database maintained on the Internet-enabled device; and
communicating one or more modifications to the current privacy setting to the web server by setting an HTTP header field of the HTTP request based on the extension information.

25. The method of claim 15, wherein the current privacy setting comprises a numeric value, wherein '0' indicates an end user's general preference to allow tracking or data sharing by the web server and wherein '1' indicates the end user's general preference is fo6 no tracking or data sharing by the web server.

26. The method of claim 15, wherein the current privacy setting is indicative of a privacy level of a plurality of privacy levels.

27. The method of claim 14, wherein the plurality of privacy settings represent enablement of various subsets of contextual information relating to one or both of the Internet-enabled device and the end user that are authorized to be used by the web server.

28. The method of claim 14, wherein the plurality of privacy settings represent enablement of various subsets of one or more of (a) personal information regarding the end user of the Internet-enabled device, (b) device information regarding capabilities or characteristics of the Internet-enabled device, (c) a geographical location of the Internet-enabled device to be shared with the web server and (d) information regarding a network to which the Internet-enabled mobile device is connected.

29. The method of claim 13, further comprising receiving, by the user agent, a response to the HTTP request from the web server, wherein the response represents a contextual response in which content associated with the response is based at least in part on the one or more values associated with the one or more HTTP header fields of the HTTP request.

30. The method of claim 14, wherein the Internet-enabled device comprises a mobile device.

31. The method of claim 14, wherein the user agent comprises a web browser.

32. The method of claim 31, wherein the menu information/structure comprises part of a browser menu of the web browser and is intended at least in part to shift navigation away from one or more web pages associated with the web server and into the browser menu.

33. The method of claim 27, further comprising receiving, by the user agent, a response to the HTTP request from the user agent, wherein the response includes embedded therein contextual menu information based at least in part on the contextual information.

34. The method of claim 33, further comprising responsive to receipt of the contextual menu information facilitating interaction with the web server by causing menu information/structure presented by the user agent to be dynamically reconfigured.

* * * * *